United States Patent
Tanaka et al.

(10) Patent No.: US 8,514,449 B2
(45) Date of Patent: Aug. 20, 2013

(54) IMAGE FORMING APPARATUS, CONTROLLING DEVICE, IMAGE FORMATION METHOD AND COMPUTER READABLE MEDIUM FOR ADJUSTING IMAGE FORMING CONDITIONS BASED ON OUTPUT

(75) Inventors: Satoshi Tanaka, Ebina (JP); Naoya Yamasaki, Ebina (JP); Gen Nakajima, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 884 days.

(21) Appl. No.: 12/486,416

(22) Filed: Jun. 17, 2009

(65) Prior Publication Data

US 2009/0316173 A1    Dec. 24, 2009

(30) Foreign Application Priority Data

Jun. 18, 2008 (JP) .................................. 2008-159776
Apr. 22, 2009 (JP) .................................. 2009-104363

(51) Int. Cl.
*H04N 1/60* (2006.01)

(52) U.S. Cl.
USPC ......... 358/1.9; 358/1.12; 358/1.13; 358/1.15; 358/504; 399/16; 399/49; 399/67; 347/19; 347/193

(58) Field of Classification Search
None
See application file for complete search history.

(56) References Cited

U.S. PATENT DOCUMENTS

| | | | | |
|---|---|---|---|---|
| 5,369,768 A * | 11/1994 | Takano | ......................... | 710/264 |
| 6,141,028 A * | 10/2000 | Aruga | ............................ | 347/193 |
| 6,297,873 B1 * | 10/2001 | Furuya | ............................ | 355/40 |
| 6,950,197 B1 * | 9/2005 | Nakajima | ........................ | 358/1.1 |
| 7,486,410 B2 * | 2/2009 | Hisamura | ..................... | 358/1.12 |
| 7,701,624 B2 * | 4/2010 | Yamada et al. | ............... | 358/504 |
| 8,081,326 B2 * | 12/2011 | Okunishi et al. | ............. | 358/1.13 |
| 8,149,480 B2 * | 4/2012 | Shiraishi | ....................... | 358/504 |

(Continued)

FOREIGN PATENT DOCUMENTS

| | | |
|---|---|---|
| JP | 07-230211 | 8/1995 |
| JP | 08-194368 | 7/1996 |

(Continued)

OTHER PUBLICATIONS

Japanese Office Action dated Apr. 23, 2013 in corresponding Japanese Application No. 2009-104363.

*Primary Examiner* — Dung Tran
(74) *Attorney, Agent, or Firm* — Sughrue Mion, PLLC

(57) ABSTRACT

The image forming apparatus includes: an image forming unit forming an image on a medium by using an image forming portion; a mode setting unit setting an image forming mode of plural image forming modes, the plural image forming modes setting, at a time of forming the image, different image forming conditions for the image forming portion included in the image forming unit; an adjusting unit performing adjustment of an image forming condition in the image forming mode; and a measuring unit individually measuring, for each of the image forming modes, a progress state after the adjustment of the image forming condition is performed by the adjusting unit in the image forming mode. The adjusting unit performs the adjustment of the image forming condition when the progress state in the image forming mode exceeds a certain value in the image forming mode.

22 Claims, 18 Drawing Sheets

(56) References Cited

U.S. PATENT DOCUMENTS

| | | | |
|---|---|---|---|
| 2005/0088476 A1* | 4/2005 | Johnson | 347/19 |
| 2007/0047981 A1 | 3/2007 | Ishida | |
| 2007/0076235 A1* | 4/2007 | Murata | 358/1.13 |
| 2007/0134012 A1* | 6/2007 | Suzuki et al. | 399/49 |
| 2007/0165255 A1* | 7/2007 | Takeuchi | 358/1.9 |
| 2008/0013975 A1* | 1/2008 | Yasutomi et al. | 399/67 |
| 2008/0212826 A1* | 9/2008 | Tanaka et al. | 382/100 |
| 2008/0219682 A1* | 9/2008 | Yamasaki et al. | 399/16 |

FOREIGN PATENT DOCUMENTS

| | | |
|---|---|---|
| JP | 2002-341699 | 11/2002 |
| JP | 2003-215904 A | 7/2003 |
| JP | 2006-201457 A | 8/2006 |
| JP | 2007-058140 A | 3/2007 |
| JP | 2007-140143 A | 6/2007 |

* cited by examiner

ID AN,514,449 B2

IMAGE FORMING APPARATUS, CONTROLLING DEVICE, IMAGE FORMATION METHOD AND COMPUTER READABLE MEDIUM FOR ADJUSTING IMAGE FORMING CONDITIONS BASED ON OUTPUT

CROSS REFERENCE TO RELATED APPLICATIONS

This application is based on and claims priority under 35 USC §119 from Japanese Patent Applications No. 2008-159776 filed Jun. 18, 2008 and No. 2009-104363 filed Apr. 22, 2009.

BACKGROUND

1. Technical Field

The present invention relates to an image forming apparatus, a controlling device, an image formation method and a computer readable medium storing a program.

2. Related Art

Image forming apparatuses such as copy machines and printers generally have multiple image forming modes different in setting conditions for image formation (image forming conditions), for the purpose of, for example, stabilizing image quality and meeting user needs. For example, an image forming apparatus is provided with multiple image forming modes corresponding to the respective sheet types to be used, and one of the modes corresponding to the sheet type chosen by the user is set. In this case, the states of image forming components installed in the image forming apparatus change depending on operation time of the image forming apparatus, environment such as temperature and humidity, and the like. For this reason, setup processing for adjusting each of the image forming conditions set for each image forming mode is performed at a predetermined timing.

SUMMARY

According to an aspect of the present invention, there is provided an image forming apparatus including: an image forming unit that forms an image on a medium by using an image forming portion; a mode setting unit that sets an image forming mode of plural image forming modes, the plural image forming modes setting, at a time of forming the image, different image forming conditions for the image forming portion included in the image forming unit; an adjusting unit that performs adjustment of an image forming condition in the image forming mode set by the mode setting unit; and a measuring unit that individually measures, for each of the image forming modes, a progress state after the adjustment of the image forming condition is performed by the adjusting unit in the image forming mode set by the mode setting unit. The adjusting unit performs the adjustment of the image forming condition when the progress state in the image forming mode set by the mode setting unit exceeds a certain value in the image forming mode, the progress state being measured by the measuring unit.

BRIEF DESCRIPTION OF THE DRAWINGS

Exemplary embodiment(s) of the present invention will be described in detail based on the following figures, wherein.

DETAILED DESCRIPTION

Exemplary embodiments of the present invention will be described below in detail with reference to the accompanying drawings.

[First Exemplary Embodiment]

Figure 1:
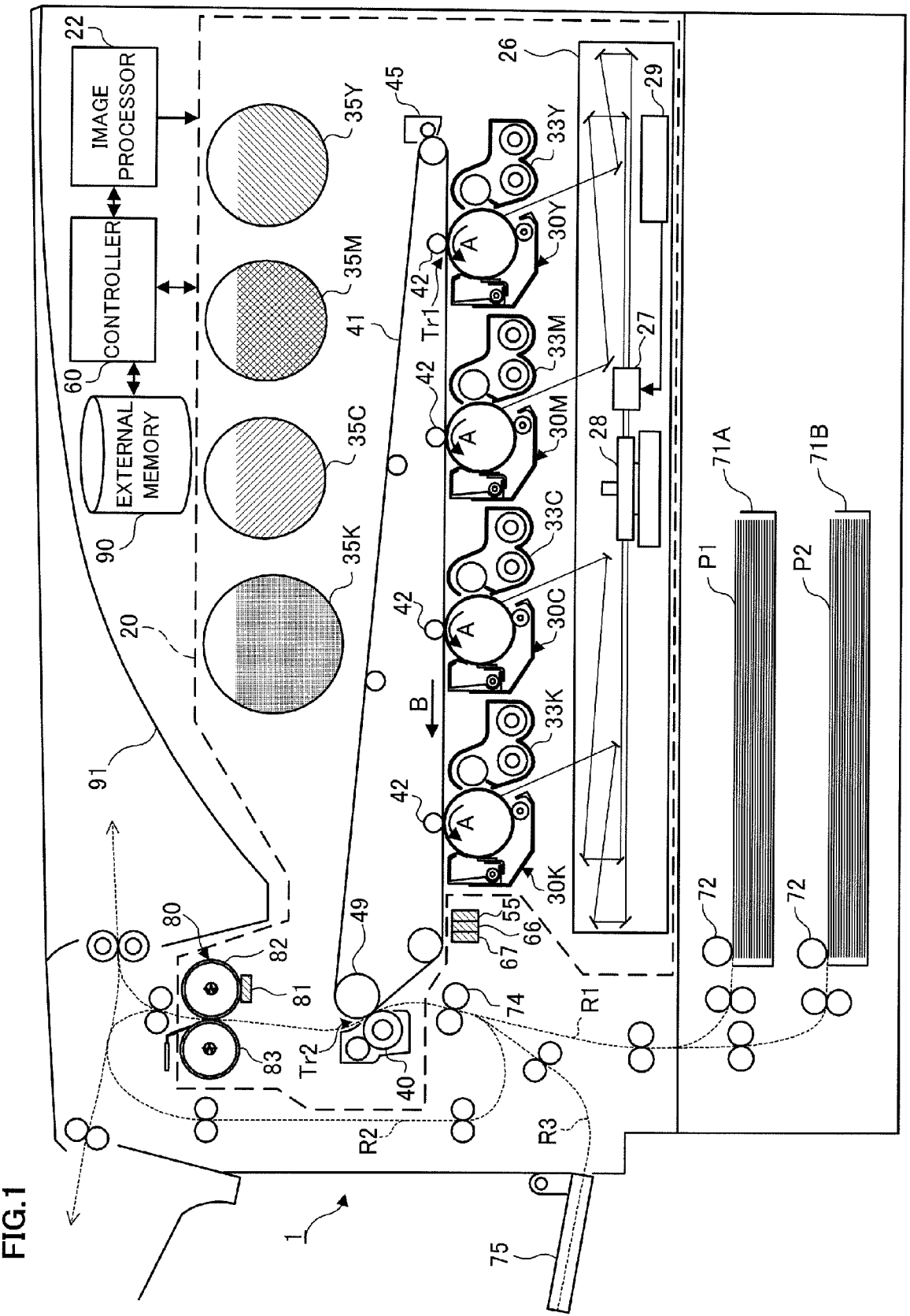
FIG. 1 is a diagram showing a configuration example of an image forming apparatus to which the first exemplary embodiment is applied.

FIG. 1 is a diagram showing a configuration example of an image forming apparatus to which the first exemplary embodiment is applied. An image forming apparatus 1 shown in FIG. 1 is a so-called tandem-type digital color printer, and includes: an image-formation process unit 20 as an example of an image forming unit that forms a color image on the basis of image data; a controller 60 that controls operations of the entire image forming apparatus 1; an image processor 22 that performs predetermined image processing on image data received, for example, from an image generating apparatus such as a personal computer (PC) or an image capturing apparatus such as a scanner; and an external memory 90 that stores therein processing programs and the like and that is implemented by a hard disk drive (HDD), for example.

The image forming apparatus 1 also includes: a reference density detection sensor 55; a humidity sensor 66 that detects the humidity inside the apparatus; and a temperature sensor 67 that detects the temperature inside the apparatus. The reference density detection sensor 55 is an example of a detecting unit that detects a toner image density, which is an example of state quantities, that is, the toner image density of each of reference density patterns made of toner images of respective colors formed on an intermediate transfer belt 41, which will be described later.

The image-formation process unit 20 includes four image formation units 30Y, 30M, 30C and 30K (each also referred to as an "image formation unit 30") that are arranged in parallel at certain intervals and that respectively form yellow (Y), magenta (M), cyan (C) and black (K) toner images.

Figure 2:
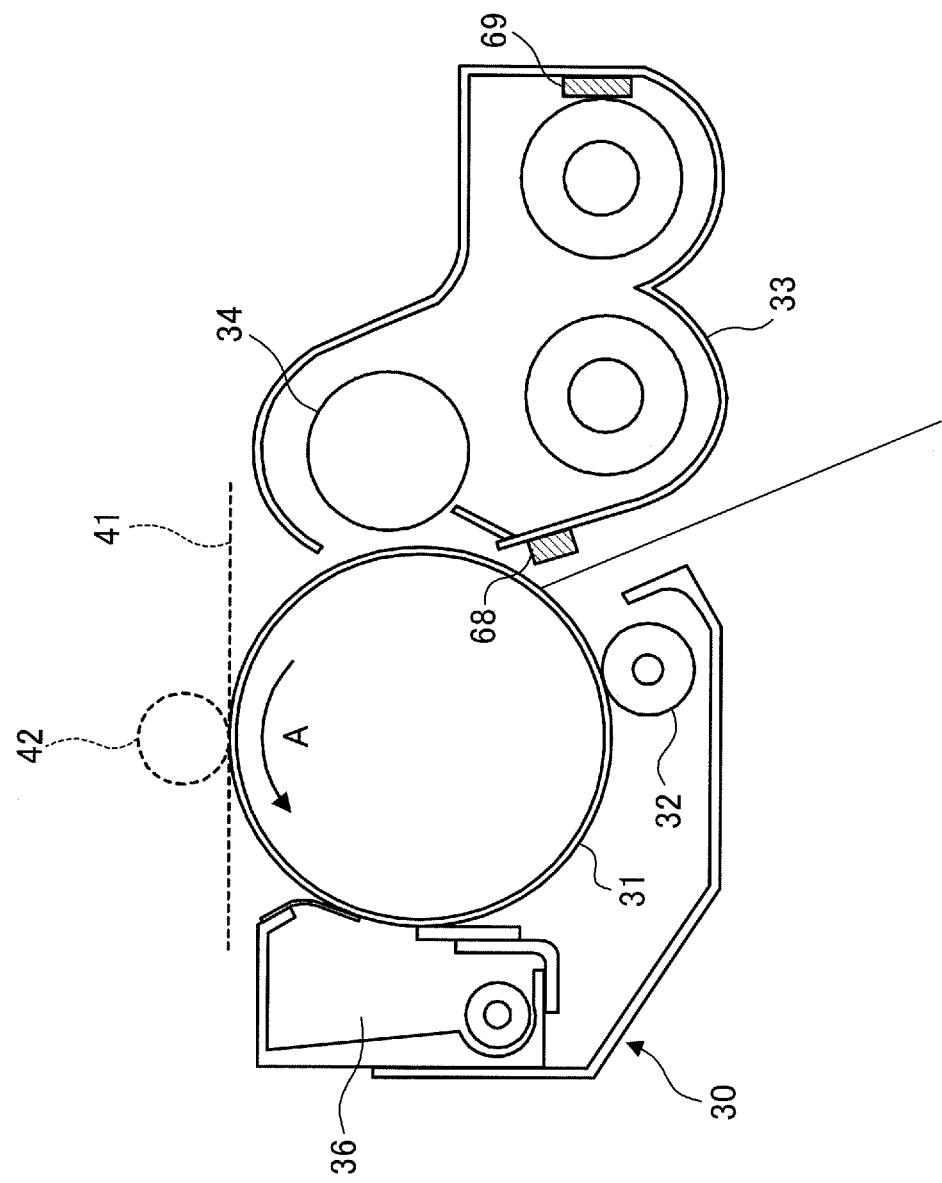
FIG. 2 is a diagram showing a configuration example of the image formation unit.

FIG. 2 is a diagram showing a configuration example of the image formation unit 30. As shown in FIG. 2, the image formation unit 30 includes: a photoconductive drum 31 as an example of an image carrier (image forming portion) that obtains an electrostatic latent image formed thereon while rotating in a direction of an arrow A; a charging roll 32 as an example of a charging unit (image forming portion) that uniformly charges the surface of the photoconductive drum 31 at a predetermined electric potential; a developing device 33 as an example of a developing unit (image forming portion) that develops the electrostatic latent image formed on the photoconductive drum 31; and a drum cleaner 36 that cleans the surface of the photoconductive drum 31 after the primary transfer.

The charging roll 32 is configured of a roll member having a conductive elastic layer and a conductive surface layer sequentially stacked on a conductive core bar made of aluminum, stainless steel or the like. The charging roll 32 is supplied with a charge bias voltage from a charge power supply (not shown in the figure), and then charges the surface of the photoconductive drum 31 while being driven to rotate with respect to the photoconductive drum 31. Here, the value of the charge bias voltage supplied from the charge power supply is set according to a control signal from the controller 60.

The developing device 33 is configured as a developing device 33Y, 33M, 33C or 33K that develops corresponding one of Y, M, C and K toner images in each of the image formation units 30. Each of the developing devices 33 holds, on a developing roll 34, a two-component developer composed of a corresponding color toner and magnetic carrier, and develops the electrostatic latent image on the photoconductive drum 31 by applying, to the developing roll 34, a direct voltage or a developing bias voltage obtained by superimposing a direct voltage on an alternating voltage.

The developing devices 33 are configured to be connected through toner transportation paths (not shown in the figure) to toner containers 35Y, 35M, 35C and 35K, respectively, and to be refilled with the toners by refill screws (not shown in the figure) provided in the toner transportation paths. Here, the toner containers 35Y, 35M, 35C and 35K store corresponding color toners, respectively. In addition, each of the developing devices 33 is provided therein with a toner density sensor 69 that detects a blend ratio (toner density) between the toner and the magnetic carrier in the two-component developer by checking, for example, a change of the magnetic permeability of the two-component developer. The toner density sensor 69 detects the toner density of the two-component developer, and transmits the detection value (toner density detection value) to the controller 60. The controller 60 controls an operation of the refill screw in the toner transportation path on the basis of the obtained toner density detection value. With this control, the amounts of the color toners refilled respectively from the toner containers 35Y, 35M, 35C and 35K to the developing devices 33 are adjusted, and thereby the toner densities inside the developing devices 33 are controlled.

Moreover, on the downstream side of the charging roll 32 in the rotation direction of the photoconductive drum 31, each of the image formation units 30 includes a potential sensor 68 that detects the surface potential on the photoconductive drum 31. The potential sensor 68 detects the surface potential of the photoconductive drum 31, and transmits the detection value (surface potential detection value) to the controller 60. The controller 60 controls the surface potential of the photoconductive drum 31 on the basis of the obtained surface potential detection value.

In addition, the image-formation process unit 20 includes: a laser exposure device 26 as an example of an image forming portion that exposes each of the photoconductive drums 31 provided in the image formation units 30; the intermediate transfer belt 41 that receives multi-transfer of the color toner images formed on the photoconductive drums 31 of the image formation units 30; primary transfer rolls 42 as an example of an image forming portion that sequentially transfer the color toner images of the image formation units 30 on the intermediate transfer belt 41 respectively at primary transfer portions Tr1 (primary transfer); a secondary transfer roll 40 as an example of an image forming portion that collectively transfers the superimposed toner images transferred on the intermediate transfer belt 41, to a paper sheet P (P1 or P2) that is a recording medium (recording paper), at a secondary transfer portion Tr2 (secondary transfer); and a fixing device 80 as an example of an image forming portion that fixes the secondarily transferred image on the paper sheet P.

The laser exposure device 26 includes: a semiconductor laser 27 as a light source; a scanning optical system (not shown in the figure) that scans and exposes each of the photoconductive drums 31 with laser light; a rotating polygon mirror 28 formed, for example, into a regular hexahedron; and a laser driver 29 that controls driving of the semiconductor laser 27. The laser driver 29 receives image data from the image processor 22, a light amount control signal from the controller 60 and the like, and controls lighting, an output light amount and the like of the semiconductor laser 27.

The primary transfer rolls 42 and the secondary transfer roll 40 are each configured of a roll member having a conductive elastic layer and a conductive surface layer sequentially stacked on a conductive core bar made of aluminum, stainless steel or the like. The primary transfer rolls 42 are each supplied with a primary-transfer bias voltage from a primary-transfer power supply (not shown in the figure), and transfer the toner images on the intermediate transfer belt 41. The secondary transfer roll 40 is supplied with a secondary-transfer bias voltage from a secondary-transfer power supply (not shown in the figure), and transfers the toner image on the paper sheet P. Here, the values of the primary-transfer bias voltage and the secondary-transfer bias voltage supplied from the primary-transfer power supply and the secondary-transfer power supply are respectively set according to control signals from the controller 60.

The fixing device 80 includes: a fixing roll 82 that includes therein a heat source; a pressing roll 83 that is arranged to press the fixing roll 82; and a temperature sensor 81 that detects the surface temperature of the fixing roll 82. While the paper sheet P having the unfixed toner image thereon is transported between the fixing roll 82 and the pressing roll 83, the unfixed toner image is heated and pressurized, and thereby the toner image is fixed on the paper sheet P. At this time, the temperature sensor 81 detects the surface temperature of the fixing roll 82, and transmits the detection value (surface temperature detection value) to the controller 60. The controller 60 sets an output value from a fixing power supply (not shown in the figure) that supplies a current to the heat source of the fixing roll 82, on the basis of the obtained surface temperature detection value, and thereby controls the surface temperature of the fixing roll 82. Moreover, the fixing device 80 controls a transporting speed of the paper sheet P according to a control signal from the controller 60.

The fixing device 80 also includes a nip pressure adjusting mechanism (not shown in the figure) that adjusts pressure (nip pressure) between the fixing roll 82 and the pressing roll 83. In the fixing device 80, the nip pressure adjusting mechanism operates according to the control signal from the controller 60, and thereby adjusts the nip pressure.

In the image forming apparatus 1, under control of the controller 60, the image processor 22 performs predetermined image processing on the image data inputted from the PC, the scanner or the like, and then provides the image data to the laser exposure device 26 in the image-formation process unit 20. Thereafter, in each of the image formation units 30, the charging roll 32 uniformly charges the photoconductive drum 31 at the predetermined potential, and the laser exposure device 26 scans and exposes the photoconductive drum 31 with laser light whose lighting operation is controlled on the basis of the image data from the image processor 22. Thereby, the electrostatic latent image is formed on the photoconductive drum 31. The formed electrostatic latent image is developed by the developing device 33. Thus, the color toner images are formed on the photoconductive drums 31, respectively.

The color toner images formed respectively in the image formation units 30 are electrostatically transferred on the intermediate transfer belt 41 by the primary transfer rolls 42, one by one, and thereby the superposed toner images are formed on the intermediate transfer belt 41. At this time, the intermediate transfer belt 41 circularly moves in an arrow B direction in FIG. 1, and the predetermined primary-transfer bias voltage is applied to each of the primary transfer rolls 42 by the transfer power supply (not shown in the figure). The superimposed toner images are transported along with the movement of the intermediate transfer belt 41 toward the secondary transfer portion Tr2 where the secondary transfer roll 40 and a backup roll 49 are arranged.

Meanwhile, multiple paper holding units 71A and 71B are arranged in the image forming apparatus 1, and the paper sheet P1 held by the paper holding unit 71A, for example, is taken out by a pickup roll 72 under the control of the controller 60 based on an instruction inputted by the user by using an operation input unit (not shown in the figure), for example. The paper sheets P1 are then transported one by one along a transportation path R1 to the position of resist rolls 74.

When the superimposed toner images are transported to the secondary transfer portion Tr2, the paper sheet P1 is supplied to the secondary transfer portion Tr2 from the resist rolls 74 at a timing when the toner images just arrive at the secondary transfer portion Tr2. Then, at the secondary transfer portion Tr2, the superimposed toner images are collectively and electrostatically transferred (secondarily transferred) on the paper sheet P1 by action of a transfer electric field formed between the backup roll 49 and the secondary transfer roll 40 having the secondary-transfer bias voltage applied thereto.

Incidentally, the paper sheets P are also transported to the secondary transfer portion Tr2 via a transportation path R2 for both side printing or a transportation path R3 from a paper holding unit 75 for manual paper feeding, in addition to the transportation path R1 along which the paper sheets P1 and P2 held respectively by the paper holding units 71A and 71B are transported.

After that, the paper sheet P1 having superimposed toner images electrostatically transferred thereon is separated from the intermediate transfer belt 41 and transported to the fixing device 80. The unfixed toner image on the paper sheet P1 transported to the fixing device 80 is subjected to fixing processing with heat and pressure by the fixing device 80, and is thereby fixed on the paper sheet P1. Then, the paper sheet P1 having the fixed image formed thereon is transported to a paper sheet stacking unit 91 provided at an output unit of the image forming apparatus 1. Meanwhile, the toner (transfer residual toner) attached to the intermediate transfer belt 41 after the secondary transfer is removed by a belt cleaner 45 that is in contact with the intermediate transfer belt 41, and is thus made ready for the next image forming cycle.

In this way, the image formation in the image forming apparatus 1 is repeatedly performed for a designated number of paper sheets.

The image forming apparatus 1 of the first exemplary embodiment is configured so that a different image forming mode would be chosen depending on the type of the chosen paper sheets P1 or P2 held by the paper holding unit 71A or 71B. For example, a "plain paper mode" and a "coated paper mode" are provided. The "plain paper mode" is an example of the image forming mode to be set when the paper sheets P1, which are plain paper sheets (uncoated paper sheets), are chosen, while the "coated paper mode" is an example of the image forming mode to be set when the paper sheets P2, which are coated paper sheets, are chosen.

Specifically, comparing an uncoated paper sheet, represented by plain paper, and a coated paper sheet, having higher glossiness than an plain paper sheet, color developability (color reproducibility) of a toner image formed by a certain amount of toner, for example, on the coated paper is higher due to a difference in reflectivity between the sheet surfaces, a difference in surface quality of a fixed toner image resulting from a difference in smoothness between the sheet surfaces, and the like. Accordingly, different toner amounts are required to make image density and color the same in both image formation on uncoated paper and image formation on coated paper. For this reason, the plain paper mode and the coated paper mode are provided, and the plain paper mode is set when the paper sheets P to be used are uncoated paper such as plain paper while the coated paper mode is set when the paper sheets P to be used are coated paper. The plain paper mode is associated with the set values of the various "image forming portions" (image forming conditions) corresponding to uncoated paper, while the coated paper mode is associated with image forming conditions corresponding to coated paper. Accordingly, by setting the plain paper mode or the coated paper mode depending on the paper sheets P to be used, an image having the same image density and color is formed in both image formation on uncoated paper and image formation on coated paper.

Such image forming mode switch (change) is performed by the controller 60 that also functions as a mode setting unit in the first exemplary embodiment, in response to an input of an instruction for choosing uncoated paper or coated paper by the user by using the operation input unit (not shown in the figure) of the image forming apparatus 1, for example.

Here, the "image forming portions" are components provided in the image-formation process unit 20 as an example of an image forming unit, such as the photoconductive drums 31, the charging rolls 32, the developing devices 33, the laser exposure device 26, the primary transfer rolls 42, the secondary transfer roll 40 and the fixing device 80, and are various function portions that function to form an image. The same is true also in the following.

Moreover, the image forming apparatus 1 of the first exemplary embodiment performs "setup processing" at, for example, a start time and an end time of image formation, and at certain intervals, such as every certain number of printed sheets, during image forming operations. The "setup processing" here is performed to always obtain the high quality of images formed by the image forming apparatus 1. The states of the image forming portions such as the photoconductive drums 31 and the like provided in the image formation units 30 change depending on operation time and use history of the image forming apparatus 1, environment such as temperature and humidity, and the like. Accordingly, the image density and color reproducibility of a toner image change due to changes in the states of the image forming portions in each of the image formation units 30, even though the image forming conditions are fixed in the plain paper mode or the coated paper mode to be set depending on the type of the paper sheets P to be used. Thus, the setup processing, which is adjustment processing for accommodating the image forming conditions to changes in the states of the image forming portions, is performed at such timing that the image density and the color reproducibility of a toner image would each be maintained within a predetermined range. In the setup processing, the image forming conditions determining image quality are changed by using state quantities each indicating the state of an image formed by each of the image formation units 30, thereby adjusting the image densities and image tones. Here, usable image forming conditions are, for example, the value of the output light amount of the semiconductor laser 27 in the laser exposure device 26 and the value of the charge bias voltage supplied to the charging roll 32. This setup processing is performed under control of the controller 60 that also functions as an adjusting unit in the first exemplary embodiment.

Here, the "image" includes: toner images formed on and held by the photoconductive drums 31, the intermediate transfer belt 41 and the paper sheets P; and electrostatic latent images formed on the photoconductive drums 31.

Next, the timing at which the controller 60 performs the setup processing will be described.

The controller 60 includes a counter that measures the number of printed sheets, for each of the image forming modes. Specifically, the controller 60 includes: a sheet-number counter CNT1 as an example of a measuring unit that measures the cumulative number of printed sheets after the previous (last) setup processing in a setting state of the plain paper mode; and a sheet-number counter CNT2 as an example of a measuring unit that measures the cumulative number of printed sheets after the previous (last) setup processing in a setting state of the coated paper mode.

In the image forming apparatus 1 of the first exemplary embodiment, the setup processing is set to be performed when the value of the cumulative number of printed sheets measured by the sheet-number counter CNT1 or CNT2 exceeds a certain value (a certain number of sheets) determined for the plain paper mode or the coated paper mode, that is, after a predetermined interval. Here, "exceeding" the certain value (the certain number of sheets) includes a case in which the cumulative number reaches the certain value and thus is not smaller than the certain value and a case in which the cumulative number is larger than the certain value. The cumulative number of the printed sheets is used here as an example of a progress state after the previous (last) setup processing.

Figure 3:
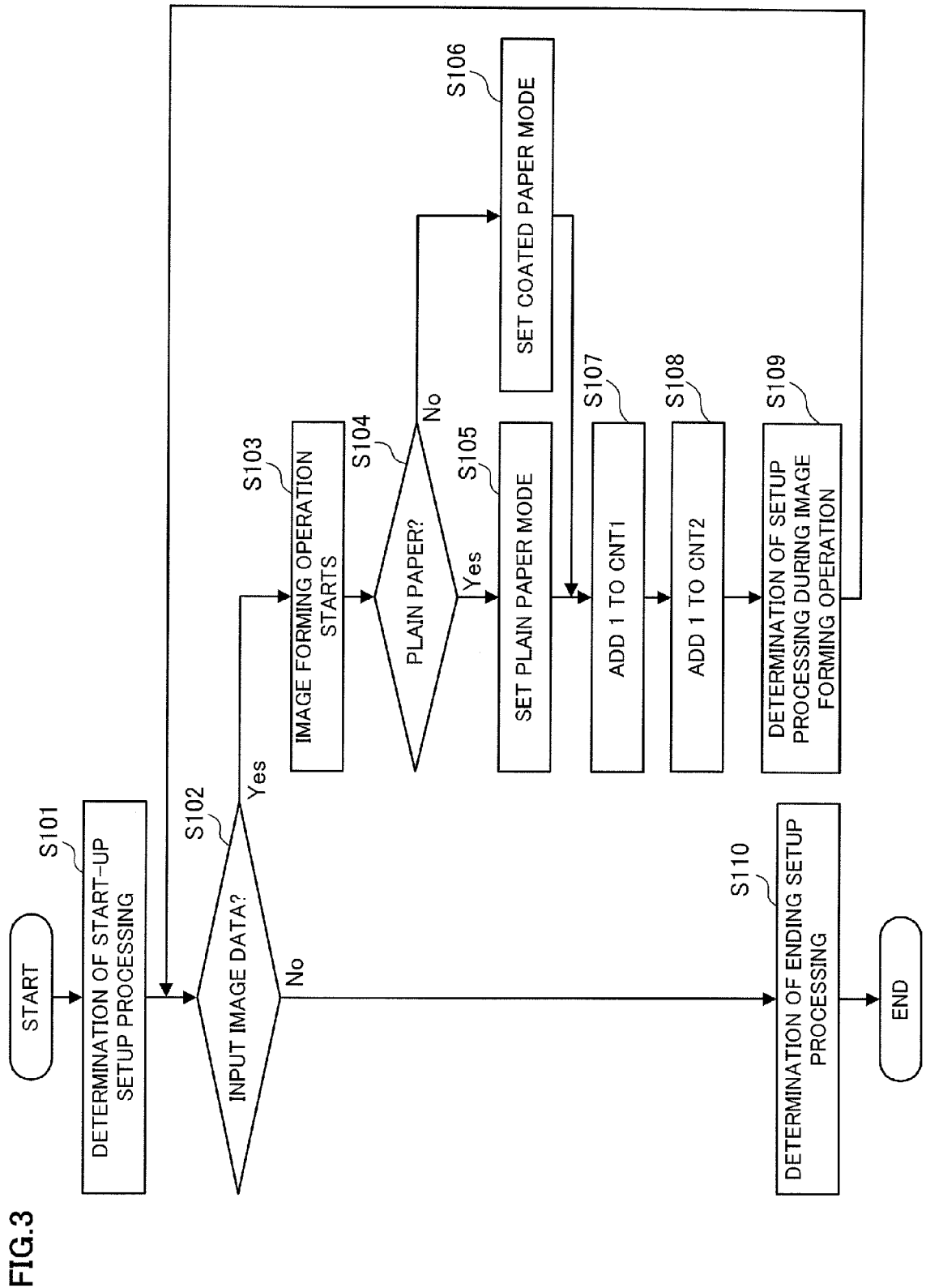
FIG. 3 is a flowchart showing an overall flow of the processing in which the controller determines whether or not to perform the setup processing.

FIG. 3 is a flowchart showing an overall flow of the processing in which the controller 60 determines whether or not to perform the setup processing. As shown in FIG. 3, when a main switch of the image forming apparatus 1 is turned on, the controller 60 determines whether or not to perform the setup processing for starting up the image forming apparatus 1 (start-up setup processing) (S101).

When image data to be printed is inputted (S102), the image forming operation starts (S103). Then, the controller 60 determines which of the paper sheets P1 (plain paper) and the paper sheets P2 (coated paper), held respectively by the paper holding units 71A and 71B, are selected (S104). When determining in step 104 that the paper sheets P1 (plain paper) are selected, the controller 60 sets the plain paper mode (S105). Instead, when determining in step 104 that the paper sheets P2 (coated paper) are selected, the controller 60 sets the coated paper mode (S106).

Both when the plain paper mode is set and when the coated paper mode is set, the controller 60 adds 1 to the count value of the sheet-number counter CNT1 on every cycle of image forming operation (S107). Similarly, the controller 60 also adds 1 to the count value of the sheet-number counter CNT2 on every cycle of image forming operation (S108). Thereafter, the controller 60 determines whether or not to perform the setup processing during the image forming operation of the image forming apparatus 1 (setup processing during image forming operation) (S109). The controller 60 repeats such determination processing until the image data input ends.

Then, when the input of the image data to be printed ends (S102), the controller 60 determines whether or not to perform the setup processing at a time of ending the image forming operation of the image forming apparatus 1 (ending setup processing) (S110).

Figure 4:
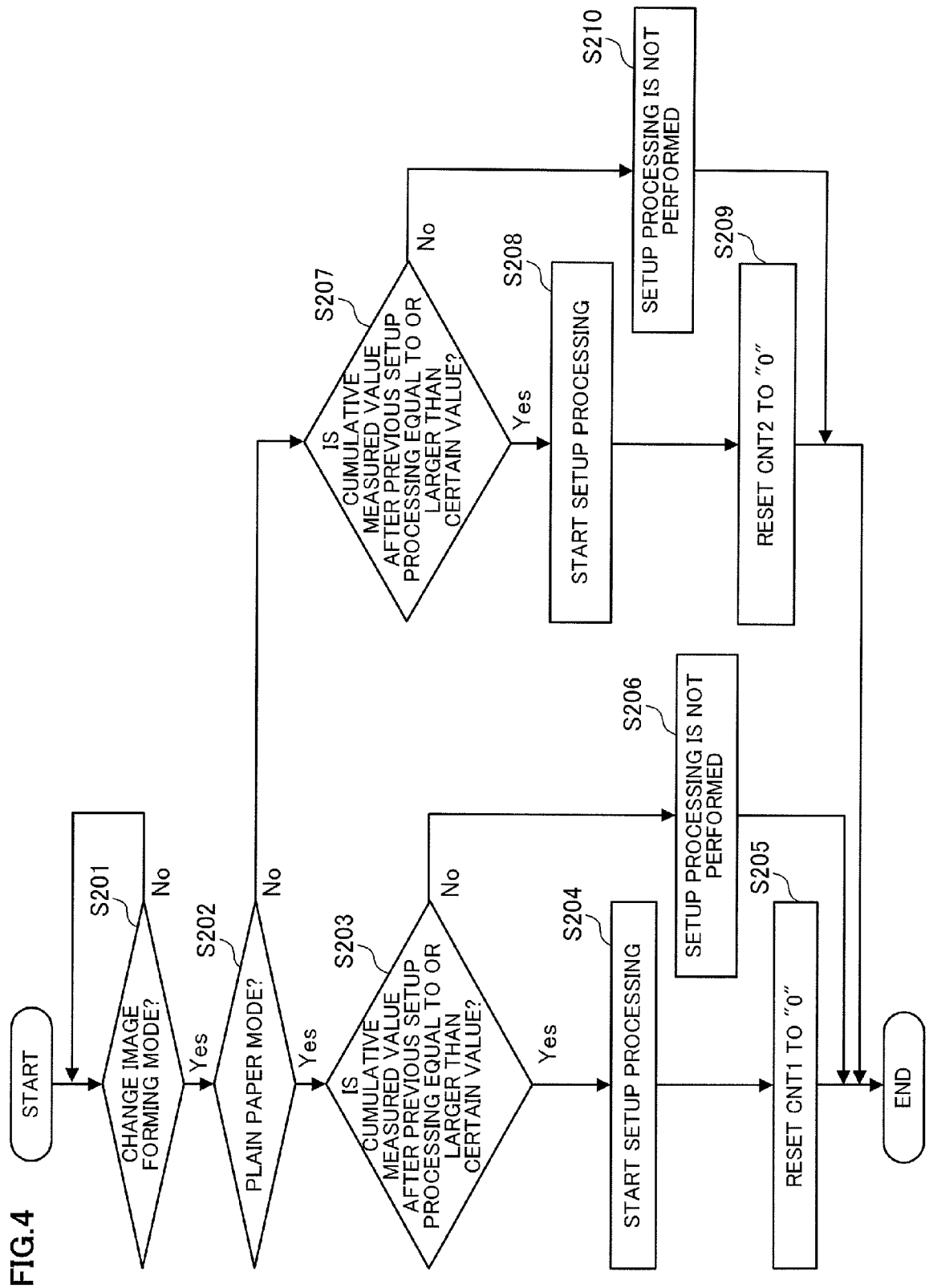
FIG. 4 is a flowchart showing an example of the procedure of the start-up setup processing, the setup processing during image forming operation, and the ending setup processing performed by the controller.

FIG. 4 is a flowchart showing an example of the procedure of the start-up setup processing, the setup processing during image forming operation, and the ending setup processing (also collectively referred to as the "setup processing") performed by the controller 60. As shown in FIG. 4, in the setup processing, first, the controller 60 monitors a change in the image forming mode made by an instruction inputted by the user by using, for example, the operation input unit (not shown in the figure) (S201). Then, when a change in the image forming mode is made, the controller 60 determines the newly-set image forming mode (S202). When determining in step 202 that the plain paper mode is set, the controller 60 determines whether or not the measured value (cumulative measured value) of the cumulative number of printed sheets after the previous setup processing in the plain paper mode measured by the sheet-number counter CNT1 for the plain paper mode is equal to or larger than a predetermined value (certain value) (S203). In other words, the controller 60 determines whether or not the number of printed sheet has reached a predetermined number of printed sheets after the previous (last) setup processing in the plain paper mode. Then, when the measured value of the cumulative number of printed sheets reaches the certain value or above at the time when the image forming mode is changed to the plain paper mode, the controller 60 starts the setup processing (S204).

Here, when the setup processing is the start-up setup processing, a long time may have passed since the previous image formation, and the image density and the image tone may possibly vary largely. In view of this, regarding the "certain value" in step 203, the certain value (interval) may be set to be shorter for the start-up setup processing in the plain paper mode than those for the setup processing during image forming operation and the ending setup processing in the plain paper mode.

When starting the setup processing, the controller 60 resets, to "0", the sheet-number counter CNT1 for the plain paper mode (S205).

Thus, if the measured value of the cumulative number of printed sheets after the previous setup processing in the plain paper mode has reached the certain value at the time when the image formation mode is changed to the plain paper mode, the controller 60 performs the setup processing to adjust the various image forming conditions.

On the other hand, if the measured value of the cumulative number of printed sheets after the previous setup processing has not reached the certain value at the time when the image formation mode is changed to the plain paper mode in step 203, the controller 60 does not perform the setup processing (S206).

Thus, if the number of printed sheets after the previous setup processing has not reached the certain number of printed sheets at the time when the image formation mode is changed to the plain paper mode, the image density is not likely to vary largely. Accordingly, the controller 60 does not perform the setup processing, thereby improving the productivity of the image formation.

In this case, since the setup processing is not performed, the sheet-number counter CNT1 for the plain paper mode is not reset, and the sheet-number counters CNT1 and CNT2 each continue the measurement of the cumulative number.

When determining in step 202 that the coated paper mode is set, the controller 60 determines whether or not the measured value of the cumulative number of printed sheets after the previous setup processing measured by the sheet-number counter CNT2 for the coated paper mode is equal to or larger than a predetermined value (certain value) (S207) In other words, the controller 60 determines whether or not the number of printed sheets has reached a predetermined number of printed sheets after the previous (last) setup processing in the coated paper mode. Then, if the measured value of the cumulative number of printed sheets has reached the certain value at the time when the image forming mode is changed to the coated paper mode, the controller 60 starts the setup processing (S208).

Here, when the setup processing is the start-up setup processing, a long time may have passed since the previous image formation, and the image density and the image tone may possibly vary largely. In view of this, regarding the "certain value" in step 207, the certain value (interval) may be set to be shorter for the start-up setup processing in the coated paper mode than those for the setup processing during image forming operation and the ending setup processing in the coated paper mode. Moreover, the interval for this start-up setup processing may be set to have a length different from that of the interval for the start-up setup processing in the plain paper mode.

When starting the setup processing, the controller 60 resets, to "0," the sheet-number counter CNT2 for the coated paper mode (S209).

Thus, if the measured value of the cumulative number of printed sheets after the previous setup processing in the coated paper mode has reached the certain value at the time when the image formation mode is changed to the coated paper mode, the controller 60 performs the setup processing to adjust the various image forming conditions.

On the other hand, if the measured value of the cumulative number of printed sheets after the previous setup processing has not reached the certain value in step 207, the controller 60 does not perform the setup processing (S210).

Thus, if the number of printed sheets after the previous setup processing has not reached the certain number of printed sheets at the time when the image formation mode is changed to the coated paper mode, the image density is not likely to vary largely. Accordingly, the controller 60 does not perform the setup processing, thereby improving the productivity of the image formation.

In this case, since the setup processing is not performed, the sheet-number counter CNT2 for the coated paper mode is not reset, and the sheet-number counters CNT1 and CNT2 each continue the measurement of the cumulative number.

Note that, although the interval of performing each of the start-up setup processing, the setup processing during image forming operation and the ending setup processing is set as a certain number of printed sheets in the image forming apparatus 1 of the first exemplary embodiment, the interval of performing each kind of the setup processing may be alternatively set as a certain period of time. In addition, if the environment such as the temperature and humidity changes to an extent more than a certain range, if a member that is any of the image forming portions determining the image forming conditions is exchanged for a new one, if the two-component developer is exchanged for a new one, or otherwise, the preconditions for setting the image forming conditions change largely at the time of turning on the image forming apparatus 1. For this reason, the image forming apparatus 1 may be configured to perform the setup processing at the time of changing the image forming mode.

Figure 6:
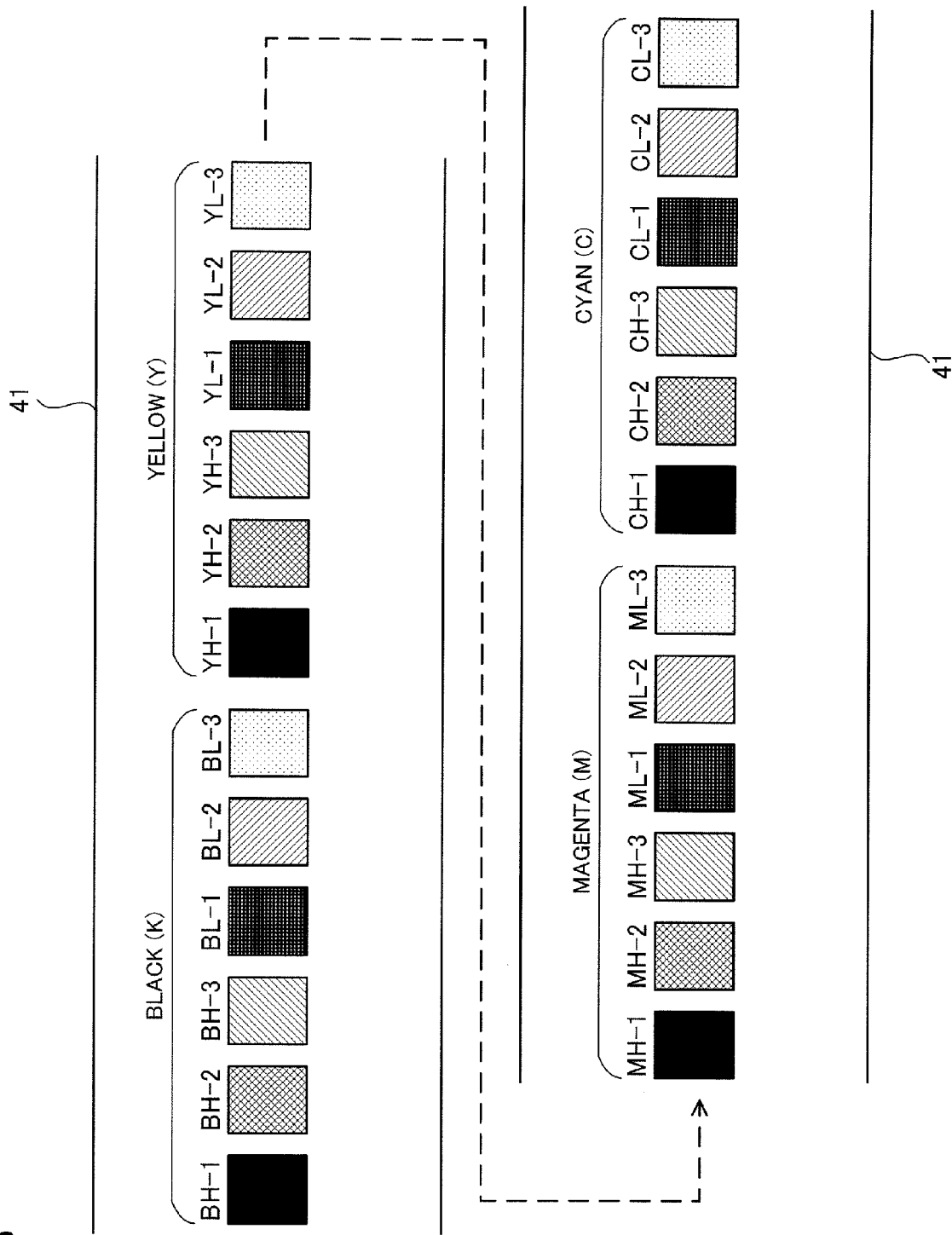
FIG. 6 is a diagram showing the multiple reference density patterns of different tones formed by each of the image formation units and then primarily transferred on the intermediate transfer belt.

Generally, in the setup processing, the reference density patterns as shown in FIG. 6 to be described later are formed, and the density of each of the patterns is detected for each color by the reference density detection sensor 55. Further, the settings of the various image forming conditions of the image forming portions are changed on the basis of the detection results. Hence, the setup processing requires the certain period of time. For this reason, if the setup processing is performed every time the image forming mode is changed as in a conventional case, the productivity of image (image productivity) at the image formation is lowered in a case where the image forming mode is changed frequently.

In contrast, in the case of the image forming apparatus 1 of the first exemplary embodiment, the setup processing is performed for every certain number of printed sheets (interval) set for each of the image forming modes. Accordingly, even when the image forming mode is changed frequently, the setup processing is not performed as log as the number of printed sheets does not exceed the certain number of printed sheets (interval) set for each of the image forming modes. In this way, the high image productivity is maintained.

Figure 5A:
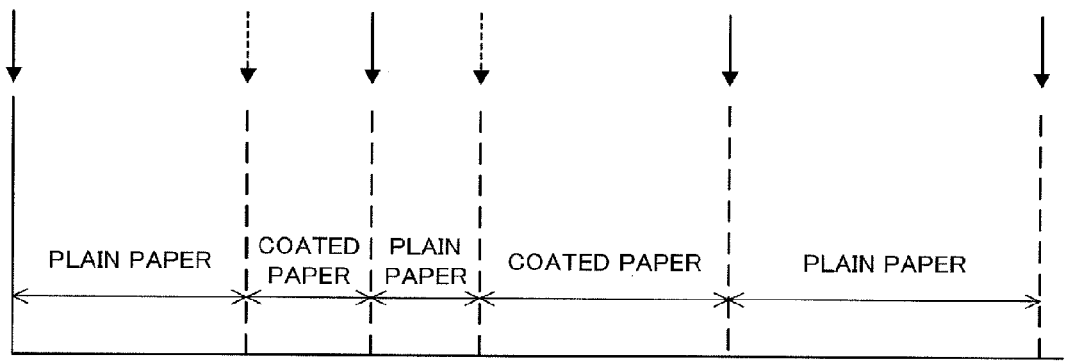
FIGS. 5A and 5B are graphs comparing a conventional timing at which the setup processing is performed and a timing at which the setup processing is performed in the first exemplary embodiment.
Figure 5B:
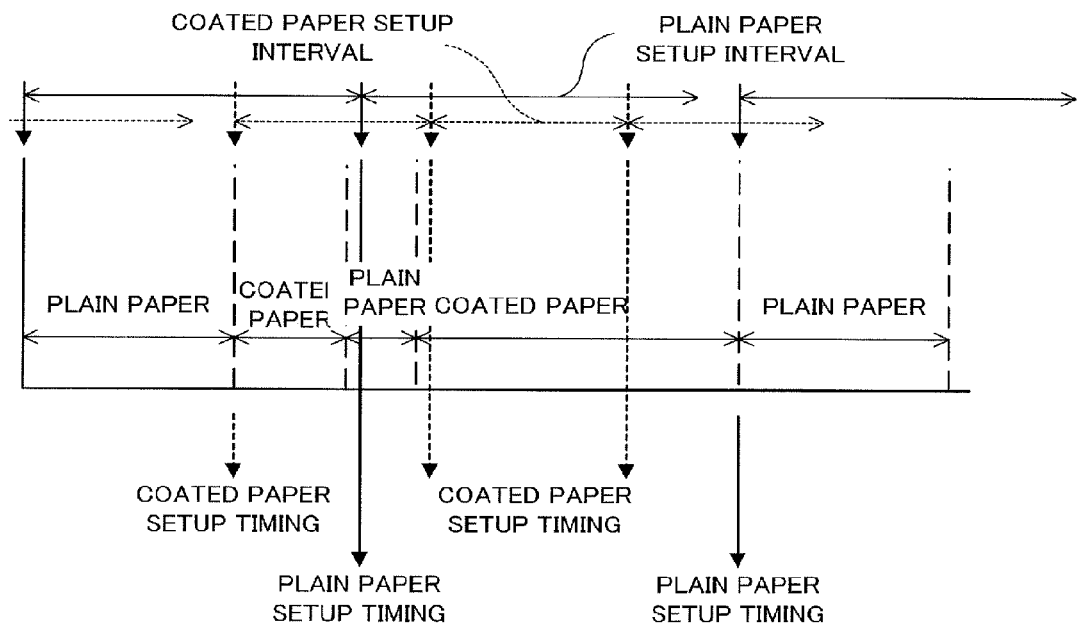

FIGS. 5A and 5B are graphs comparing a conventional timing at which the setup processing is performed and a timing at which the setup processing is performed (coated paper setup timing and plain paper setup timing) in the first exemplary embodiment. FIG. 5A shows a conventional case of performing the setup processing every time the image forming mode is changed. In the case of employing this timing, the setup processing, requiring the certain period of time, is performed frequently, consequently lowering the image productivity.

In contrast, in the first exemplary embodiment shown in FIG. 5B, the setup processing is performed, for example, for every certain number of printed sheets (interval) set for each of the image forming modes. In addition, once the setup processing is performed, the sheet-number counter CNT1 or CNT2 corresponding to the image forming mode in which the setup processing is performed is reset to "0," and the cumulative number of printed sheets is newly measured from the previous setup processing. If the predetermined interval has already passed, the setup processing is also performed at the time when the image forming mode is changed. Thus, a situation in which the setup processing is not performed for a long period of time in either of the image forming modes is prevented. Moreover, the frequency of the setup processing, requiring a long period of time as described above, is reduced.

Next, a concrete example of the setup processing performed by the image forming apparatus 1 of the first exemplary embodiment will be described.

Firstly, the controller 60 sets the surface potential of the photoconductive drum 31 in each of the image formation units 30 at predetermined two levels, that is, a high potential level and a low potential level, sequentially. At this time, each of the various image forming conditions such as the output light amount value of the semiconductor laser 27, the developing bias voltage value, and the primary-transfer bias voltage value for the primary transfer rolls 42 is set at a predetermined value (certain value). Then, the controller 60 causes each of the image formation units 30 to form multiple reference density patterns having different area ratios (tones) at each of the potential levels.

Here, FIG. 6 is a diagram showing the multiple reference density patterns of different tones formed by each of the image formation units 30 and then primarily transferred on the intermediate transfer belt 41. The example shown in FIG. 6 shows the case where the black (K) image formation unit 30K, for example, forms three reference density patterns BH-1, BH-2 and BH-3 of three tones at the high potential level and three reference density patterns BL-1, BL-2 and BL-3 of three tones at the low potential level. Accordingly, the image formation unit 30K forms the six reference density patterns of six tones in total.

Likewise, the yellow (Y) image formation unit 30Y forms reference density patterns YH-1, YH-2 and YH-3 as well as YL-1, YL-2 and YL-3, the magenta (M) image formation unit 30M forms reference density patterns MH-1, MH-2 and MH-3 as well as ML-1, ML-2 and ML-3, and the cyan (C) image formation unit 30C forms reference density patterns CH-1, CH-2 and CH-3 as well as CL-1, CL-2 and CL-3.

The density of each of the reference density patterns for each color formed as shown in FIG. 6, for example, is detected by the reference density detection sensor 55 arranged on the downstream side of the image formation unit 30K in the transporting direction of the intermediate transfer belt 41. Then, the detected density values of the reference density patterns for each color are transmitted to the controller 60 as the state quantities each indicating the state of an image formed by each of the image formation units 30.

Similarly, the detection value of the internal humidity (detected humidity value) detected by the humidity sensor 66 and the detection value of the internal temperature (detected temperature value) detected by the temperature sensor 67 are also transmitted to the controller 60.

Then, the controller 60 sets the various image forming conditions according to the detected density values of the reference density patterns for each color, the detected humidity value and the detected temperature value, and thereby adjusts the image densities and tones so that the high image quality would be maintained. The controller 60 here functions as a state quantity obtaining unit in the first exemplary embodiment.

Figure 7:
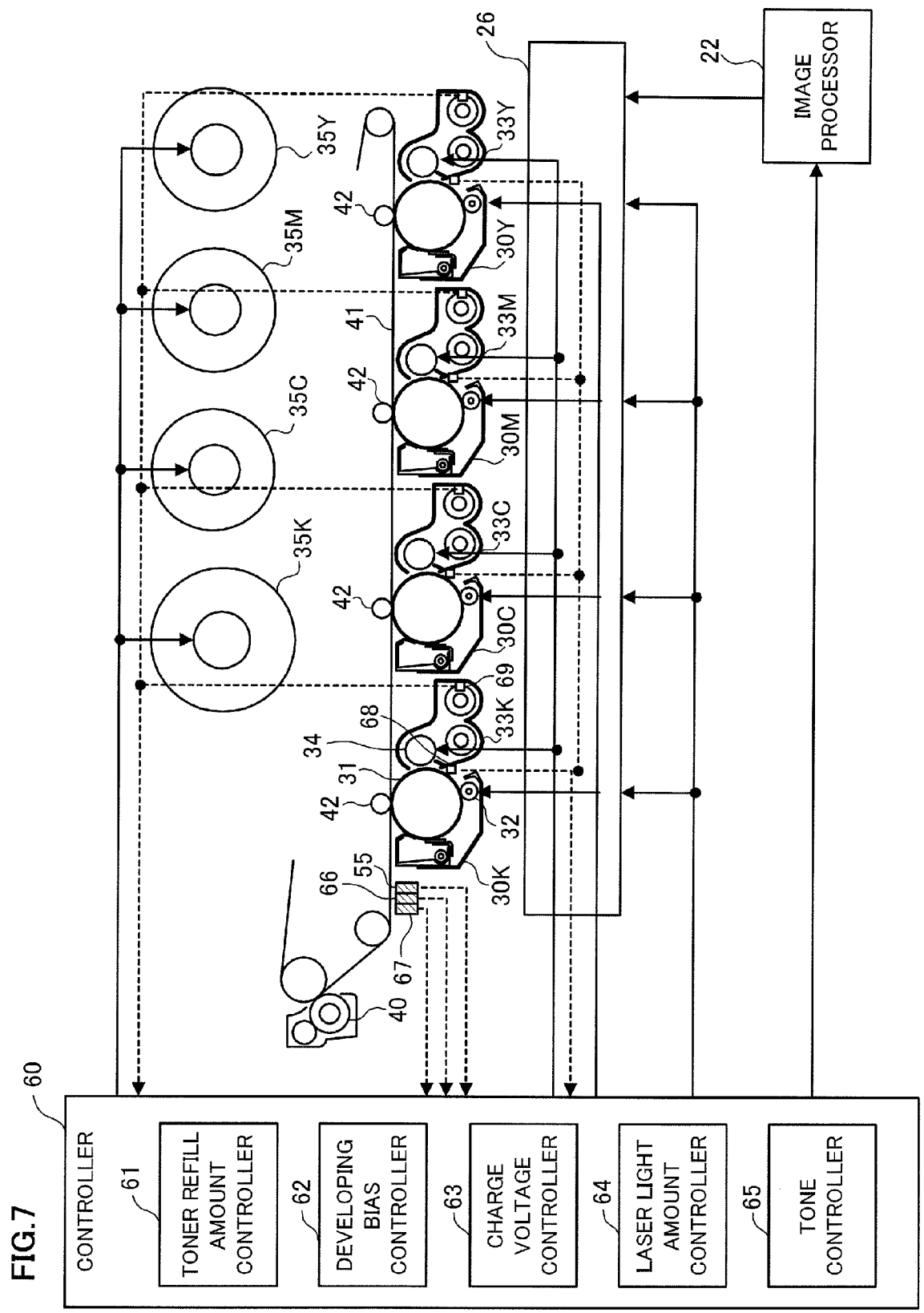
FIG. 7 is a block diagram for explaining a functional configuration with which the controller performs the setup processing.

FIG. 7 is a block diagram for explaining a functional configuration with which the controller 60 performs the setup processing in the first exemplary embodiment. As shown in FIG. 7, the controller 60 includes, as functional units that perform the setup processing, a toner refill amount controller 61, a developing bias controller 62, a charge voltage controller 63, a laser light amount controller 64 and a tone controller 65. The detected density values of the reference density patterns for each color detected by the reference density detection sensor 55, the detected humidity value detected by the humidity sensor 66, the detected temperature value detected by the temperature sensor 67 and the like are transmitted to the toner refill amount controller 61, the developing bias controller 62, the charge voltage controller 63, the laser light amount controller 64 and the tone controller 65.

Figure 8:
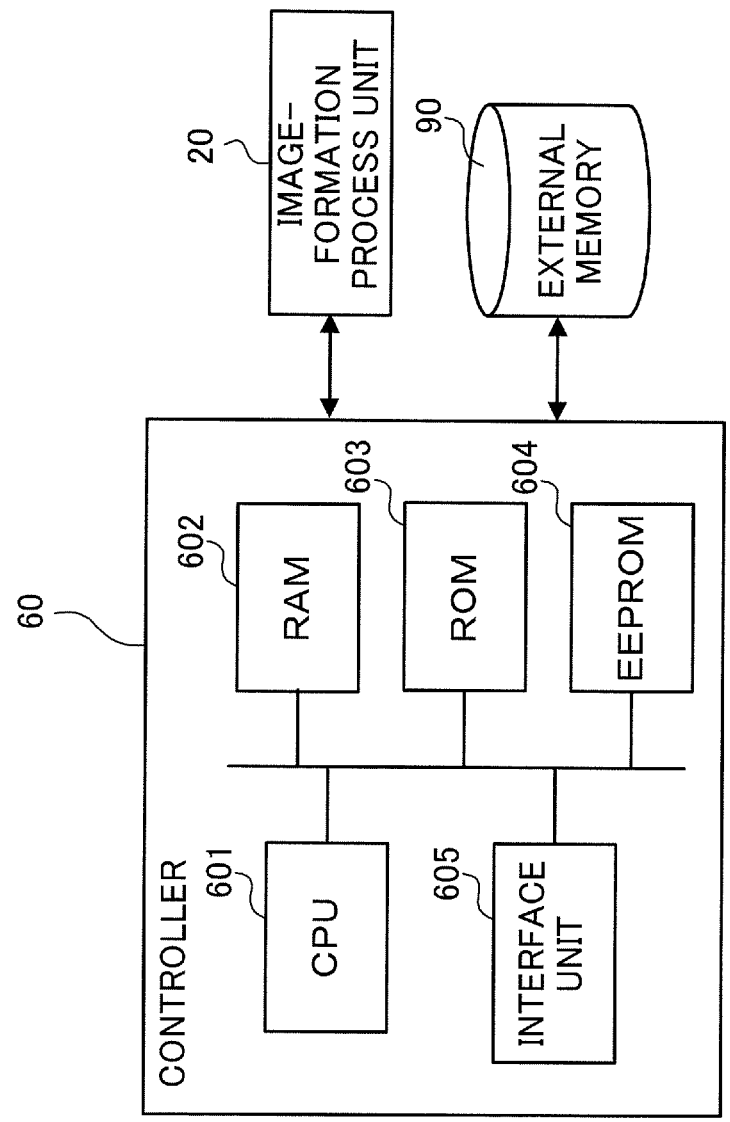
FIG. 8 is a block diagram showing an internal configuration of the controller.

FIG. 8 is a block diagram showing an internal configuration of the controller 60 in the first exemplary embodiment. As shown in FIG. 8, the controller 60 includes: a CPU 601 that executes digital computing processing in accordance with a predetermined processing program at the setup processing; a RAM 602 that stores, therein, the processing program and the like performed by the CPU 601; a ROM 603 that stores, therein, data such as setting values used for the processing program and the like executed by the CPU 601; an EEPROM 604 that is rewritable and that is an example of a storing unit that may store data even in a case of the power supply terminated; and an interface unit 605 that controls input and output of signals from and to respective parts such as the image-formation process unit 20, the external memory 90 and the reference density detection sensor 55 which are connected to the controller 60.

The CPU 601 of the controller 60 reads a program for achieving respective functions of the toner refill amount controller 61, the developing bias controller 62, the charge voltage controller 63, the laser light amount controller 64 and the tone controller 65, from the external memory 90 to the RAM 602 and the like, and then the various processing is executed. In addition, tables provided for respective functional units described later (for example, a charge bias voltage table and the like) are prestored in the EEPROM 604 of the controller 60.

In the external memory 90, the processing program executed by the controller 60 is stored. The controller 60 reads this processing program at the start-up of the image forming apparatus 1, and thereby the setup processing in the controller 60 in the first exemplary embodiment is executed. As another provision method for this program, this program maybe provided so as to be prestored in the ROM 603, and loaded from the ROM 603 to the RAM 602. Moreover, in the case of employing a rewritable ROM 603 such as an EEPROM, only this program may be installed in the ROM 603 after the controller 60 is set, and then the program may be loaded from the ROM 603 to the RAM 602. In addition, this program may be transmitted to the image forming apparatus 1 through a network such as the Internet and then loaded to the RAM 602 of the controller 60.

The laser light amount controller 64 is provided with an output light amount table determining the correspondence of the output light amount with each of the detected density values (or a difference between each of the detected density values and its target value), the detected humidity value and the detected temperature value. According to this output light amount table, the laser light amount controller 64 controls the value of the output light amount of the semiconductor laser 27 emitting from the laser exposure device 26 to the photoconductive drums 31. The charge voltage controller 63 is provided with the charge bias voltage table determining the correspondence of the charge bias voltage value with each of the detected density values (or the difference between each of the detected density values and its target value), the detected humidity value and the detected temperature value. According to this charge bias voltage table, the charge voltage controller 63 controls the value of the charge bias voltage supplied to each of the charging rolls 32 of the image formation units 30. The developing bias controller 62 is provided with a developing bias voltage table determining the correspondence of the developing bias voltage value with each of the detected density values (or the difference between each of the detected density values and its target value), the detected humidity value and the detected temperature value. According to this developing bias voltage table, the developing bias controller 62 controls the value of the developing bias voltage applied to each of the developing rolls 34. The toner refill amount controller 61 is provided with a toner density table determining the correspondence of the toner density with each of the detected density values (or the difference between each of the detected density values and its target value), the detected humidity value and the detected temperature value. According to this toner density table, the toner refill amount controller 61 controls, if needed, the refill amounts of the toners of various colors refilled respectively in the developing devices 33 by the toner containers 35Y, 35M, 35C and 35K.

Moreover, the tone controller 65 generates tone control signals based on the detected density values detected by the reference density detection sensor 55, and outputs the tone control signals to the image processor 22. The image processor 22 is provided with a lookup table (LUT) for converting the area ratios of inputted image data according to the tone control signals. Thus, the image processor 22 converts the area ratios of the inputted image data by referring to the LUT corresponding to the tone control signals, and transmits the resultant image data to the laser exposure device 26.

Note that, when performing the setup processing, the controller 60 of the first exemplary embodiment is configured to control the image forming conditions including the value of the output light amount of the semiconductor laser 27 in the laser exposure device 26, the value of the charge bias voltage supplied to each of the charging rolls 32 and the value of the developing bias voltage applied to each of the developing rolls 34, and also, if necessary, the refill amounts of the toners of various colors refilled respectively in the developing devices 33. However, the controller 60 may also be configured to control the surface temperature, the fixing speed and the nip pressure of the fixing roll 82 in the fixing device 80, and the value of the primary-transfer bias voltage applied to the primary transfer rolls 42 in addition to the aforementioned values, and to change the lookup table (LUT) that is provided to the image processor 22 and used according to the tone control signals.

In the first exemplary embodiment, description has been given by taking, as examples of the image forming modes, the plain paper mode, which is set when uncoated paper represented by plain paper is chosen, and the coated paper mode, which is set when coated paper is chosen. In addition to these image forming modes set depending on the paper type, image forming modes corresponding to characteristics of images to be formed may be set, for example. Specifically, such image forming modes include an image forming mode giving a high priority to image tone, an image forming mode giving a high priority to resolution, an image forming mode improving reproducibility of characters and lines, an image forming mode improving reproducibility of pictures, an image forming mode improving reproducibility of maps. In each of such an image forming mode, parameters for creating pixels (screen line width, screen pitch, screen angle and the like) need to be changed, and therefore the setup processing is performed mainly to adjust the lookup table (LUT) used according to the tone control signals in the image processor 22.

Further, image forming modes corresponding to the kinds, the number and the like of the image formation units 30 provided in the image-formation process unit 20 maybe set. Specifically, such image forming modes are those set when image formation units 30 for forming toner images of different colors are provided in addition to, or instead of, the image formation units 30 forming the toner images of the respective colors of Y, M, C and K. In such an image forming mode, the toner amount of superimposed toner images tends to be increased, and the drive state of the image forming apparatus 1 changes. Accordingly, the setup processing is performed mainly to adjust the developing bias voltage value for adjusting the toner developing amount, the primary-transfer bias voltage value, the secondary-transfer bias voltage value and the like.

Moreover, a high image quality mode giving a high priority to improvement of the image quality, a toner saving mode giving a high priority to reduction of toner consumption, a bar-code mode giving a high priority to reproducibility of bar codes each formed of thin lines, a gloss changing mode changing and adjusting gloss of images and the like may be set.

In the image forming apparatus 1 of the first exemplary embodiment, when multiple image forming modes, regardless of the situations for which the image forming modes are set, are provided, the setup processing is performed at the timing set for each of the image forming modes.

As described above, in the image forming apparatus 1 of the first exemplary embodiment, interval (certain value) for performing the setup processing is set for each of the image forming modes, and the setup processing is performed to adjust the various image forming conditions, at the time when the measured value of the cumulative number of printed sheets after the previous setup processing in one of the image forming modes reaches the corresponding predetermined value (certain value). When the image forming mode is changed and the measured value of the cumulative number of printed sheets after the previous setup processing in any of the newly-set image forming modes has not reached the corresponding certain value at the time of the change, the setup processing is not performed.

[Second Exemplary Embodiment]

In the first exemplary embodiment, description has been given of the configuration in which the interval (certain value) at which the setup processing is performed is set for each image forming mode, and the setup processing is performed when the measured value of the cumulative number of printed sheets after the previous setup processing in one of the image forming modes has reached the corresponding predetermined value (certain value). In the second exemplary embodiment, description will be given of a configuration in which, in the first setup processing in a newly-set image forming mode after a change in the image forming mode, a detected density value of each of reference density patterns for each color detected in the setup processing is set as a target value for the corresponding image density in the newly-set image forming mode. Incidentally, the same reference numerals are given to the same components as those in the first exemplary embodiment, and the detailed explanation thereof is omitted here.

Descriptions will be given of the setup processing performed by a controller 60 in an image forming apparatus 1 of the second exemplary embodiment when the image forming mode is changed.

In the image forming apparatus 1 of the second exemplary embodiment, when the image forming mode is changed and the number of printed sheets after the previous setup processing in each of the image forming modes has not reached the corresponding predetermined number of printed sheets (certain value) at the time when the image forming mode is changed, the setup processing is not performed at the time of the change. However, when image formation is performed in the newly-set image forming mode and the measured value of the cumulative number of printed sheets after the previous setup processing in the image forming mode reaches the predetermined value (certain value), the first setup processing after the change to the image forming mode is performed. At this time, processing for adjusting the various image forming conditions in the changed image forming mode is performed by using, as a target value for an image density, each of the detected density values of the reference density patterns for each color detected in the setup processing.

Figure 9:
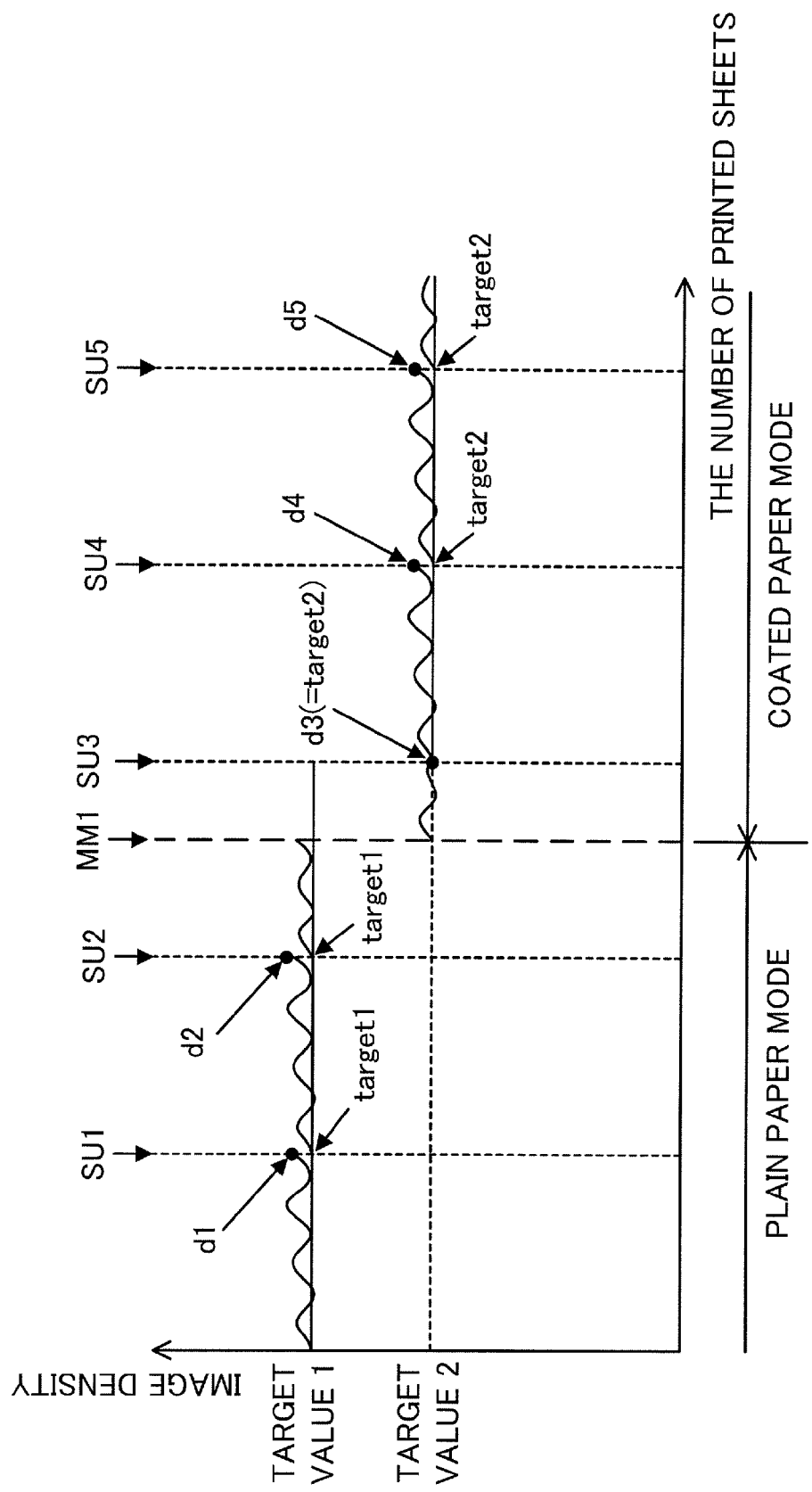
FIG. 9 is a view for explaining the target value of the image density set in the first setup processing after the change in the image forming mode.

FIG. 9 is a view for explaining the target value of the image density set in the first setup processing after the change in the image forming mode. The example in FIG. 9 shows the case where a plain paper mode and a coated paper mode are provided as examples of the image forming modes as in the first exemplary embodiment, and a state in which the plain paper mode is set is changed to the coated paper mode. Here, the setup processing is performed for every certain number of printed sheets.

As shown in FIG. 9, in the plain paper mode, which is set initially, setup processing (SU1, SU2) is performed at the time when the sheet-number counter CNT1 for the plain paper mode shows that the measured value of the cumulative number of printed sheets after the previous setup processing reaches a predetermined value (certain value). Moreover, a target value 1 (target 1) for each image density in the plain paper mode is set in advance in the image forming apparatus 1, and is stored in the EEPROM 604 in the controller 60. In the setup processing (SU1, SU2) in the plain paper mode, each of the density values of the reference density patterns for each color is detected by a reference density detection sensor 55, and the controller 60 compares the detected density value (d1, d2) with the corresponding target value 1 (target 1). On the basis of the result of comparison of the detected density value (d1, d2) with the target value 1 (target 1), the detected humidity value and the detected temperature value, the controller 60 controls the output light amount value of the semiconductor laser 27, the charge bias voltage value and the developing bias voltage value so that the image density would be the target value 1.

Note that the target value 1 here for the image density is an example of the target value of the state quantity. The controller 60 functions as a progress state obtaining unit that obtains the measured value of the cumulative number of printed sheets from the sheet-number counter CNT1. Moreover, the controller 60 functions as a controller that performs control for adjusting the image forming conditions when the measured progress state value exceeds the predetermined value (certain value). Further, the CPU 601 of the controller 60 functions as a target value obtaining unit that obtains the target value of the state quantity from the EEPROM 604.

Thereafter, when the image forming mode is changed and the coated paper mode is set (MM1), setup processing (SU3, SU4, SU5) is performed at the time when the sheet-number counter CNT2 for the coated paper mode shows that the measured value of the cumulative number of printed sheets after the previous setup processing reaches a predetermined value (certain value). In this case, the following setup processing is performed in the first setup processing (SU3) after the change to the coated paper mode. Specifically, the controller 60 sets, as a target value 2 (target 2) for the image density, the detected density value (d3) of each of the reference density patterns for each color detected in this setup processing. Then, the controller 60 stores the target value 2 (target 2) set at the time of this setup processing (SU3), in the EEPROM 604 in the controller 60. Subsequently, the output light amount value of the semiconductor laser 27, the charge bias voltage value and the developing bias voltage value with which the image density would be the target value 2 are set. Thereafter, in the subsequent setup processing (SU4, SU5) in the coated paper mode, the controller 60 compares the detected density value (d4, d5) of each of the reference density patterns for each color detected by the reference density detection sensor 55, with the corresponding target value 2 (target 2). Then, on the basis of the result of comparison of the detected density value (d4, d5) with the target value 2 in terms of the image density, the detected humidity value and the detected temperature value, the output light amount value of the semiconductor laser 27, the charge bias voltage value and the developing bias voltage value are controlled so that the image density would be the target value 2.

Note that the target value 2 here for the image density is an example of the target value of the state quantity.

As described above, when the image forming mode is changed, the image forming apparatus 1 of the second exemplary embodiment sets, as the target value for the image density in the newly-set image forming mode (target value 2 in FIG. 9=target 2), the detected density value of each of the reference density patterns for each color detected in the first setup processing in the newly-set image forming mode (d3 in SU3 in FIG. 9). This reduces a variation in image density in the same image forming mode.

The image forming apparatus 1 of the second exemplary embodiment performs the setup processing for every certain interval set for each image forming mode, and hence the setup processing is not performed at the time of a change in the image forming mode in many cases. Accordingly, the image density is not modified until the first setup processing after the change in the image forming mode is performed. Meanwhile, plain paper (uncoated paper) used in the plain paper mode and coated paper used in the coated paper mode have a difference in color development. For this reason, the density of the image on each paper sheet P after the change in the image forming mode changes from the density before the change in the image forming mode. Consequently, each image on a coated paper sheet formed before the next setup processing is performed and after the change in the image forming mode is different in image density level from that of each image on a plain paper sheet formed before the change in the image forming mode.

In this case, if the target value for the image density (target 1 in FIG. 9, for example) set before the change in the image forming mode is used without any modification in the first setup processing (SU3 in FIG. 9, for example) after the change in the image forming mode as has been used conventionally, the image density is modified to the original image density level. Consequently, the image density after the first setup processing after the change in the image forming mode again changes from that before the first setup processing.

In the conventional setup processing as described above, the image density before the change in the image forming mode (target 1 in FIG. 9, for example) and the image density modified in the first setup processing after the change in the image forming mode (target 1 in FIG. 9, for example) are made substantially equal to each other. However, in the image forming mode after the change, the image density after the first setup processing changes from that before the first setup processing (SU3 in FIG. 9, for example). This generates a variation in image density and color between the images formed in the same image forming mode, and thereby causes a problem for the user.

In contrast to this, in the case of the image forming apparatus 1 of the second exemplary embodiment, in the first setup processing after the change in the image forming mode (SU3 in FIG. 9, for example), the detected density value of each of the reference density patterns for each color detected in the setup processing (d3 in FIG. 9, for example) is set as the target value for the image density (target 2 in FIG. 9, for example). This reduces a variation in image density in the same image forming mode, and thereby maintains uniformity of each of image density and color between the images formed in the same image forming mode.

Next, description will be given of a procedure of the setup processing performed by the controller 60.

Here, as in the first exemplary embodiment, the plain paper mode and the coated paper mode are set. Moreover, the controller 60 includes, as counters that measure the number of printed sheets: the sheet-number counter CNT1 that measures the cumulative number of printed sheets after the previous (last) setup processing in the setting state of the plain paper mode; and the sheet-number counter CNT2 that measures the cumulative number of printed sheets after the previous (last) setup processing in the setting state of the coated paper mode. Moreover, the descriptions will be given by taking the output light amount value of the semiconductor laser 27 as an example of the image forming condition whose setting is to be changed. However, the settings of the other image forming conditions such as the charge bias voltage value and the developing bias voltage value are also changed similarly as needed.

In the image forming apparatus 1 of the second exemplary embodiment, the setup processing is set to be performed when the value of the cumulative number of printed sheets measured by the sheet-number counter CNT1 or CNT2 exceeds the certain number of printed sheets determined for the corresponding image forming mode, that is, when the predetermined interval elapse.

Figure 10:
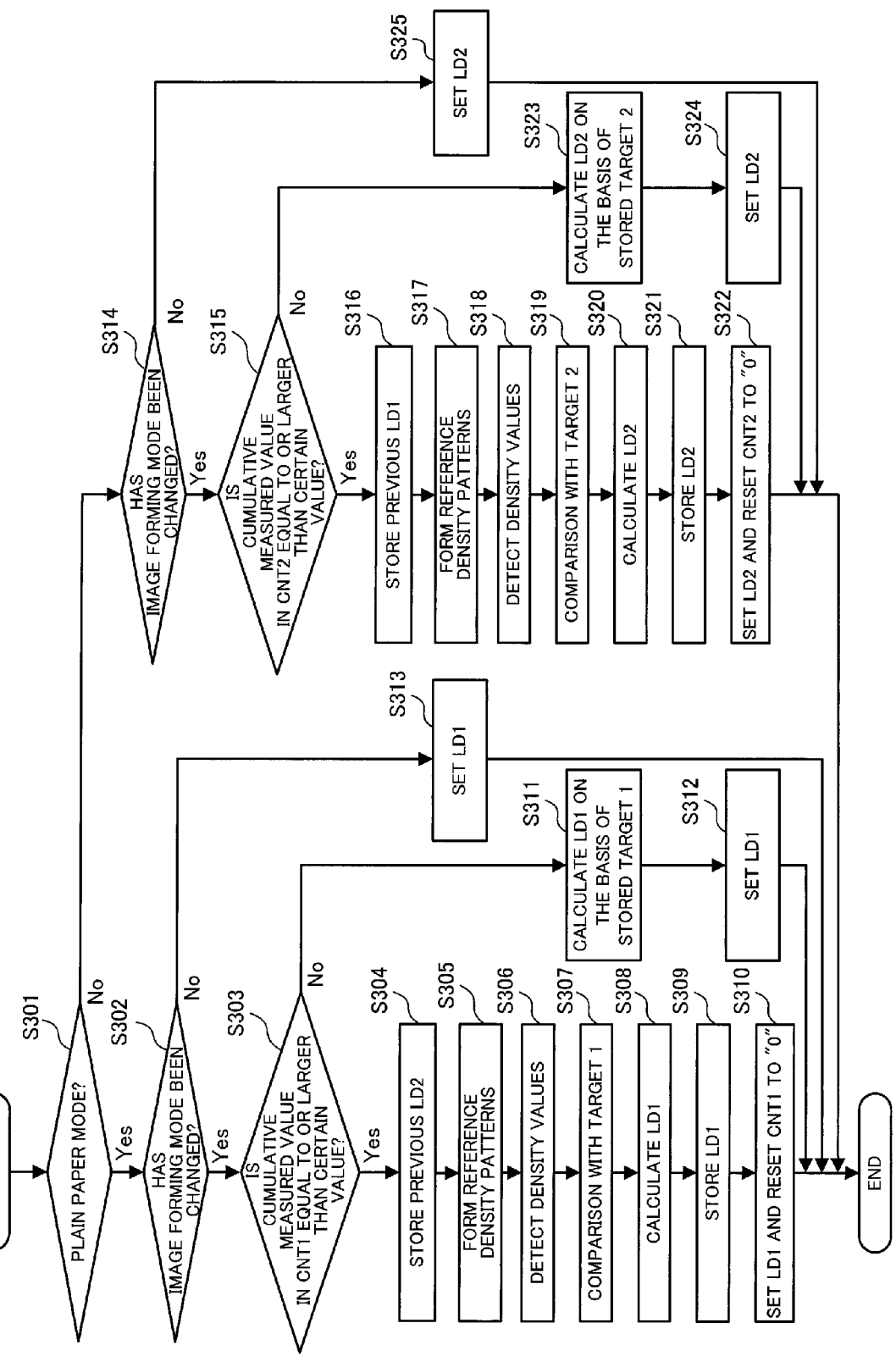
FIG. 10 is a flowchart showing an example of a procedure of the start-up setup processing performed by the controller.

FIG. 10 is a flowchart showing an example of a procedure of the start-up setup processing performed by the controller 60. As shown in FIG. 10, in the start-up setup processing, first, the controller 60 determines the image forming mode set by an instruction inputted by the user by using, for example, the operation input unit (not shown in the figure) (S301). When determining in step 301 that the plain paper mode is set, the controller 60 determines whether or not the image forming mode has been changed since the previous image formation (S302).

When determining in step 302 that the image forming mode has been changed, the controller 60 determines whether or not the measured value of the cumulative number of printed sheets after the previous setup processing is equal to or larger than a predetermined value (certain value), from the sheet-number counter CNT1 for the plain paper mode (S303). In other words, the controller 60 determines whether or not the number of printed sheets after the previous setup processing in the plain paper mode has reached the certain number of printed sheets. Then, when the measured value of the cumulative number of printed sheets has reached the certain value or more, the controller 60 starts the setup processing. Here, if a long time has passed since the previous image formation, the image density may possibly vary largely. In view of this, the "certain value" in step 303 may be set to be shorter than the interval for the setup processing during image forming operation in the plain paper mode.

When the setup processing is started, the controller 60 firstly stores, in the EEPROM 604, an output light amount value LD2 of the semiconductor laser 27 in the coated paper mode set in the previous image formation (S304). Subsequently, the controller 60 forms the reference density patterns (see FIG. 6) (S305), and the density values thereof are detected for each color by the reference density detection sensor 55 (S306). Then, the controller 60 compares each of the detected density values of the reference density patterns for each color with the corresponding target value 1 for the image density in the plain paper mode stored in the EEPROM 604 (S307).

By using the output light amount table determining the correspondence of the output light amount with each of the detected humidity value, the detected temperature value and the difference between each of the detected density values and its target value 1, the controller 60 calculates an output light amount value LD1 of the semiconductor laser 27 emitted to the corresponding photoconductive drum 31 from a laser exposure device 26 (S308). Then, the controller 60 stores the calculated output light amount value LD1 in the EEPROM 604 (S309). Moreover, the controller 60 sets the output light amount of the semiconductor laser 27 to the calculated output light amount value LD1, and resets the sheet-number counter CNT1 for the plain paper mode to "0" (S310).

In this way, when the image forming apparatus 1 is started up after the cumulative number of printed sheets after the previous setup processing in the plain paper mode has reached the certain value, the controller 60 performs the setup processing to set the various image forming conditions.

On the other hand, when determining in step 303 that the measured value of the cumulative number of printed sheets after the previous setup processing in the plain paper mode does not reach the certain value, the controller 60 performs the following setup processing. Specifically, the controller 60 calculates the output light amount value LD1 of the semiconductor laser 27 such that the image density would be the target value 1, by referring to the output light amount table, on the basis of the target value 1 stored in the EEPROM 604 during the previous setup processing, and the detected humidity value and the detected temperature value which are currently detected (S311). Then, the controller 60 sets the output light amount of the semiconductor laser 27 to the output light amount value LD1 (S312).

As described above, when the image forming apparatus 1 is started up before the cumulative number of printed sheets after the previous setup processing in the plain paper mode reaches the certain number of printed sheets, the image density is not likely to vary largely. For this reason, the last target value 1 is used and thereby the setup processing requiring the certain period of time is skipped. This leads to an improvement in the image productivity.

Moreover, when determining in step 302 that the image forming mode is not changed since the last image formation, the controller 60 sets, as the output light amount of the semiconductor laser 27, the output light amount value LD1 stored in the EEPROM 604 during the previous setup processing without any modification (S313). In this case, similarly, the image density is not likely to vary largely. Accordingly, the image productivity is improved by using the output light amount value LD1 set in the previous setup processing while skipping the setup processing requiring the certain period of time.

Next, when determining in step 301 that the coated paper mode is set, the controller 60 determines whether or not the image forming mode has been changed since the last image formation (S314).

When determining in step 314 that the coated paper mode is set as a result of the change in the image forming mode, the controller 60 determines whether or not the measured value of the cumulative number of printed sheets after the previous setup processing measured by the sheet-number counter CNT2 for the coated paper mode is equal to or larger than the predetermined value (certain value) (S315). In other words, the controller 60 determines whether or not the measured value of the cumulative number of printed sheets after the previous setup processing in the coated paper mode has reached the certain number of printed sheets. When the measured value of the cumulative number of printed sheets reaches the certain value or above, the controller 60 starts the setup processing. Here, if a long time has passed since the previous image formation, the image density is likely to vary largely. For this reason, "the certain value" in step 315 may be set to be shorter than the interval of performing the setup processing during image forming operation in the coated paper mode. In addition, in this case, the interval may be set to have a length different from that of the interval of performing the start-up setup processing in the plain paper mode.

When starting the setup processing, the controller 60 firstly stores, in the EEPROM 604, the output light amount value LD1 of the semiconductor laser 27 in the plain paper mode set in the previous image formation (S316). Subsequently, the controller 60 forms the reference density patterns (see FIG. 6) (S317), and the density values thereof are detected for each color by the reference density detection sensor 55 (S318). Then, the controller 60 compares each of the detected density values of the reference density patterns for each color with the corresponding target value 2 for the image density in the coated paper mode stored in the EEPROM 604 (S319).

By using the output light amount table determining the correspondence of the output light amount with each of the detected humidity value, the detected temperature value and the difference between each of the detected density values and its target value 2, the controller 60 calculates an output light amount value LD2 of the semiconductor laser 27 emitted to the corresponding photoconductive drum 31 from the laser exposure device 26 (S320). Then, the controller 60 stores the calculated output light amount value LD2 in the EEPROM 604 (S321). Moreover, the controller 60 sets the output light amount of the semiconductor laser 27 to the calculated output light amount value LD2, and resets the sheet-number counter CNT2 for the coated paper mode to "0" (S322).

In this way, when the image forming apparatus 1 is started up after the cumulative number of printed sheets after the previous setup processing in the coated paper mode reaches the certain number of printed sheets, the controller 60 performs the setup processing to set the various image forming conditions.

On the other hand, when determining in step 315 that the measured value of the cumulative number of printed sheets after the previous setup processing does not reach the certain value, the controller 60 performs the following setup processing. Specifically, the controller 60 calculates the output light amount value LD2 of the semiconductor laser 27 such that the image density would be the target value 2, by referring to the output light amount table, on the basis of the target value 2 stored in the EEPROM 604 during the previous setup processing, and the detected humidity value and the detected temperature value which are currently detected (S323). Then, the controller 60 sets the output light amount of the semiconductor laser 27 to the output light amount value LD2 (S324).

As described above, when the image forming apparatus 1 is started up before the cumulative number of printed sheets after the previous setup processing in the coated paper mode reaches the certain number of printed sheets, the image density is not likely to vary largely. For this reason, the previous target value 2 is used and thereby the setup processing requiring the certain period of time is skipped. This leads to an improvement in the image productivity.

Moreover, when determining in step 314 that the image forming mode is not changed since the previous image formation, the controller 60 sets, as the output light amount of the semiconductor laser 27, the output light amount value LD2 stored in the EEPROM 604 during the previous setup processing without any modification (S325). In this case, similarly, the image density is not likely to vary largely. Accordingly, the image productivity is improved by using the output light amount value LD2 set in the previous setup processing while skipping the setup processing requiring the certain period of time.

Figure 11:
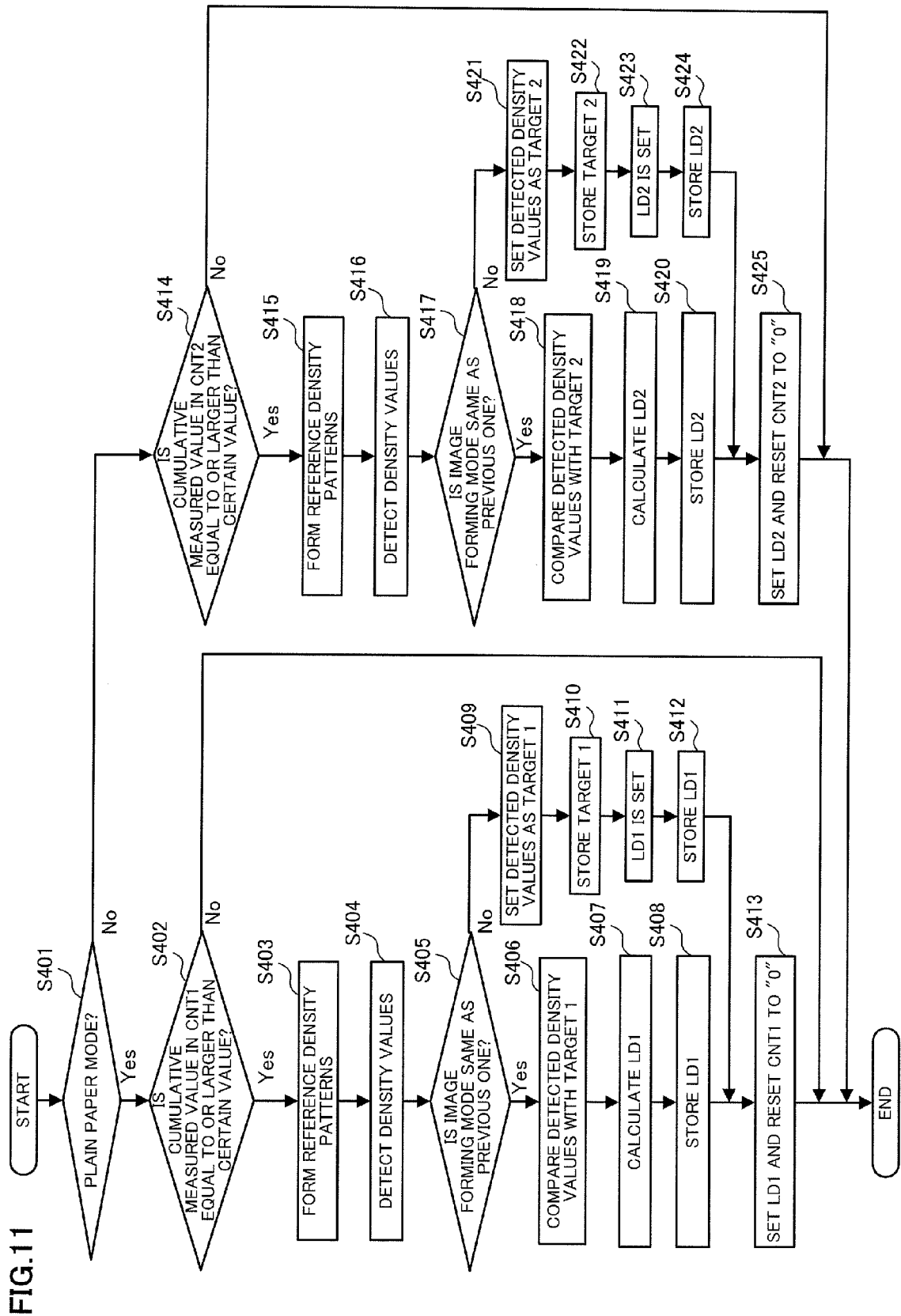
FIG. 11 is a flowchart showing an example of the procedure of the setup processing during image forming operation preformed by the controller.

Next, FIG. 11 is a flowchart showing an example of the procedure of the setup processing during image forming operation preformed by the controller 60. As shown in FIG. 11, in the setup processing during image forming operation, the controller 60 determines the image forming mode set by an instruction inputted by the user by using, for example, an operation input unit (not shown in the figure) (S401). When determining in step 401 that the plain paper mode is set, the controller 60 determines whether or not the measured value of the cumulative number of printed sheets after the previous setup processing is equal to or larger than a predetermined value (certain value), from the sheet-number counter CNT1 for the plain paper mode (S402). In other words, the controller 60 determines whether or not the measured value of the cumulative number of printed sheets after the previous setup processing in the plain paper mode has reached the certain number of printed sheets. When the measured value of the cumulative number of printed sheets reaches the certain value or more, the controller 60 starts the setup processing. The "certain value" here is, for example, a certain number of printed sheets set as the interval of performing the setup processing during image forming operation in the plain paper mode.

When starting the setup processing, the controller 60 forms the reference density patterns (see FIG. 6) (S403), and the density values thereof are detected for each color by the reference density detection sensor 55 (S404). Then, the controller 60 determines whether or not the plain paper mode set for the current setup processing is the same as the image forming mode (previous image forming mode) set for the previous setup processing (S405).

When determining in step 405 that the plain paper mode is the same as the image forming mode set for the previous setup processing, the controller 60 compares the detected density value of each of the reference density patterns for each color detected by the reference density detection sensor 55, with the corresponding target value 1 for the image density in the plain paper mode stored in the EEPROM 604 in the controller 60 (S406). Then, by using the output light amount table determining the correspondence of the output light amount with each of the detected humidity value, the detected temperature value and the difference between each of the detected density values and its target value 1, the controller 60 calculates the output light amount value LD1 of the semiconductor laser 27 emitted to the corresponding photoconductive drum 31 from the laser exposure device 26 (S407). The calculated output light amount value LD1 is stored in the EEPROM 604 in the controller 60 (S408).

On the other hand, when determining in step 405 that the plain paper mode is different from the image forming mode set for the previous setup processing, that is, when the image forming mode has been changed, the controller 60 sets the detected density value of each of the reference density patterns for each color detected by the reference density detection sensor 55 as the target value 1 for the image density (S409), and stores the target value 1 in the EEPROM 604 in the controller 60 (S410). Thereafter, the controller 60 sets the output light amount value of the semiconductor laser 27 at the output light amount value LD1 that allows the image density to be the target value 1 (S411), and then stores the output light amount value LD1 in the EEPROM 604 in the controller 60 (S412).

The controller 60 sets the output light amount value LD1 set in step 408 or 412, as the output light amount value of the semiconductor laser 27, and resets the sheet-number counter CNT1 for the plain paper mode to "0" (S413).

As described above, in the image forming apparatus 1 of the second exemplary embodiment, when the image forming mode is changed, the detected density value of each of the reference density patterns for each color detected in the first setup processing in the newly-set plain paper mode is set as the target value 1 for the image density in the newly-set plain paper mode. This setting reduces the variation in image density in the same image forming mode. In addition, this shortens the time required to correct the image forming conditions, and thereby enhances the image productivity.

On the other hand, when determining in step 401 that the coated paper mode is set, the controller 60 determines whether the measured value of the cumulative number of printed sheets after the previous setup processing is equal to or larger than a predetermined value (certain value), from the sheet-number counter CNT2 for the coated paper mode (S414). In other words, the controller 60 determines whether or not the measured value of the cumulative number of printed sheets after the previous setup processing in the coated paper mode has reached the certain number of printed sheets. When the measured value of the cumulative number of printed sheets reaches the certain value or more, the controller 60 starts the setup processing. The "certain value" here is, for example, a certain number of printed sheets set as the interval of performing the setup processing during image forming operation in the coated paper mode. Moreover, in this case, the interval may be set to have a length different from that of the interval of performing the setup processing during image forming operation in the plain paper mode.

When starting the setup processing, the controller 60 forms the reference density patterns (see FIG. 6) (S415), and the density values thereof are detected for each color by the reference density detection sensor 55 (S416). Then, the controller 60 determines whether or not the coated paper mode set for the current setup processing is the same as the image forming mode set for the previous setup processing (S417).

When determining in step 417 that the coated paper mode is the same as the image forming mode set for the previous setup processing, the controller 60 compares the detected density value of each of the reference density patterns for each color detected by the reference density detection sensor 55, with the corresponding target value 2 for the image density in the coated paper mode stored in the EEPROM 604 in the controller 60 (S418). Then, by using the output light amount table determining the correspondence of the output light amount with each of the detected humidity value, the detected temperature value and the difference between each of the detected density values and its target value 2, the controller 60 calculates the output light amount value LD2 of the semiconductor laser 27 emitted to the corresponding photoconductive drum 31 from the laser exposure device 26 (S419). The calculated output light amount value LD2 is stored in the EEPROM 604 in the controller 60 (S420).

On the other hand, when determining in step 417 that the coated paper mode is different from the image forming mode set for the previous setup processing, that is, when the image forming mode is changed, the controller 60 sets the detected density value of each of the reference density patterns for each color detected by the reference density detection sensor 55 as the target value 2 for the image density (S421), and stores the target value 2 in the EEPROM 604 in the controller 60 (S422). Thereafter, the controller 60 sets the output light amount value of the semiconductor laser 27 to the output light amount value LD2 that allows the image density to be the target value 2 (S423), and then stores the output light amount value LD2 in the EEPROM 604 in the controller 60 (S424)

The controller 60 sets the output light amount value LD2 set in step 420 or 424, as the output light amount value of the semiconductor laser 27, and resets the sheet-number counter CNT2 for the coated paper mode to "0" (S425).

In this case, similarly, when the image forming mode is changed, the detected density value of each of the reference density patterns for each color detected in the first setup processing in the newly-set coated paper mode is set as the target value 2 for the image density in the newly-set coated paper mode. This setting reduces the variation in image density in the same image forming mode. In addition, this shortens the time required to correct the image forming conditions, and thereby enhances the image productivity.

Subsequently, the ending setup processing is performed in the substantially same manner as the setup processing during image forming operation shown in FIG. 11. In the ending setup processing, the "certain value" used for the determination in step 402 shown in FIG. 11 may be set to be shorter than the interval of performing the setup processing during image forming operation in the plain paper mode in consideration of a case where the certain value will not be in use for a long time until the next image formation. Similarly, the "certain value" used for the determination in step 414 may be set to be shorter than the interval of performing the setup processing during image forming operation in the coated paper mode.

Note that, although the interval of performing each of the start-up setup processing, the setup processing during image forming operation and the ending setup processing is set as a certain number of printed sheets in the image forming apparatus 1 of the second exemplary embodiment, the interval of performing each kind of the setup processing may be set as a certain period of time as an example of a progress state. In addition, if the environment such as the temperature and humidity changes to an extent more than a certain range, if a member that is any of the image forming portions determining the image forming conditions is exchanged for a new one, if the two-component developer is exchanged for a new one, or otherwise, the preconditions for setting the image forming conditions change largely at the time of turning on the image forming apparatus 1. For this reason, the image forming apparatus 1 may be configured to perform the setup processing in the first image formation after the image forming mode is changed.

In the setup processing during image forming operation, the interval of performing the setup processing in each of the image forming modes may correspond to timing of a change in the image forming mode, in some cases. In other words, for example, MM1 and SU3 in FIG. 9 described above are at the same timing. In this case, the setup processing is performed at the same time as the change in the image forming mode. For such a case, the image forming apparatus 1 may be configured to start, before the change in the image forming mode, the setup processing in the image forming mode after the change. Specifically, the image forming apparatus 1 maybe configured to start the setup processing while the image forming mode before the change is still set, in the case of performing the change in the image forming mode and the setup processing at the same time.

A predetermined time is required for the setup processing, in which each of reference density patterns for each color is firstly formed, each of the various image forming conditions such as the output light amount value of the semiconductor laser 27 is calculated, and then the image forming conditions are respectively set for the image forming portions. By starting the setup processing before image forming mode changing processing, the setup processing and the image forming mode changing processing are performed in parallel. This shortens the time required for the image forming mode changing processing, and thereby enhances the image productivity.

In this case, by setting the start timing of the setup processing so that the setup processing would end earlier than the image forming mode changing processing, the setting of the various image forming conditions adjusted in the setup processing is completed in the image forming portions by the time the image forming mode is changed. Thus, the image forming mode changing processing is performed efficiently.

Next, more detailed description will be given of the point that each kind of the setup processing is performed when the value of the cumulative number of printed sheets measured by the sheet-number counter CNT1 or CNT2 reaches the certain interval set for the corresponding one of the image forming modes.

Figure 12:
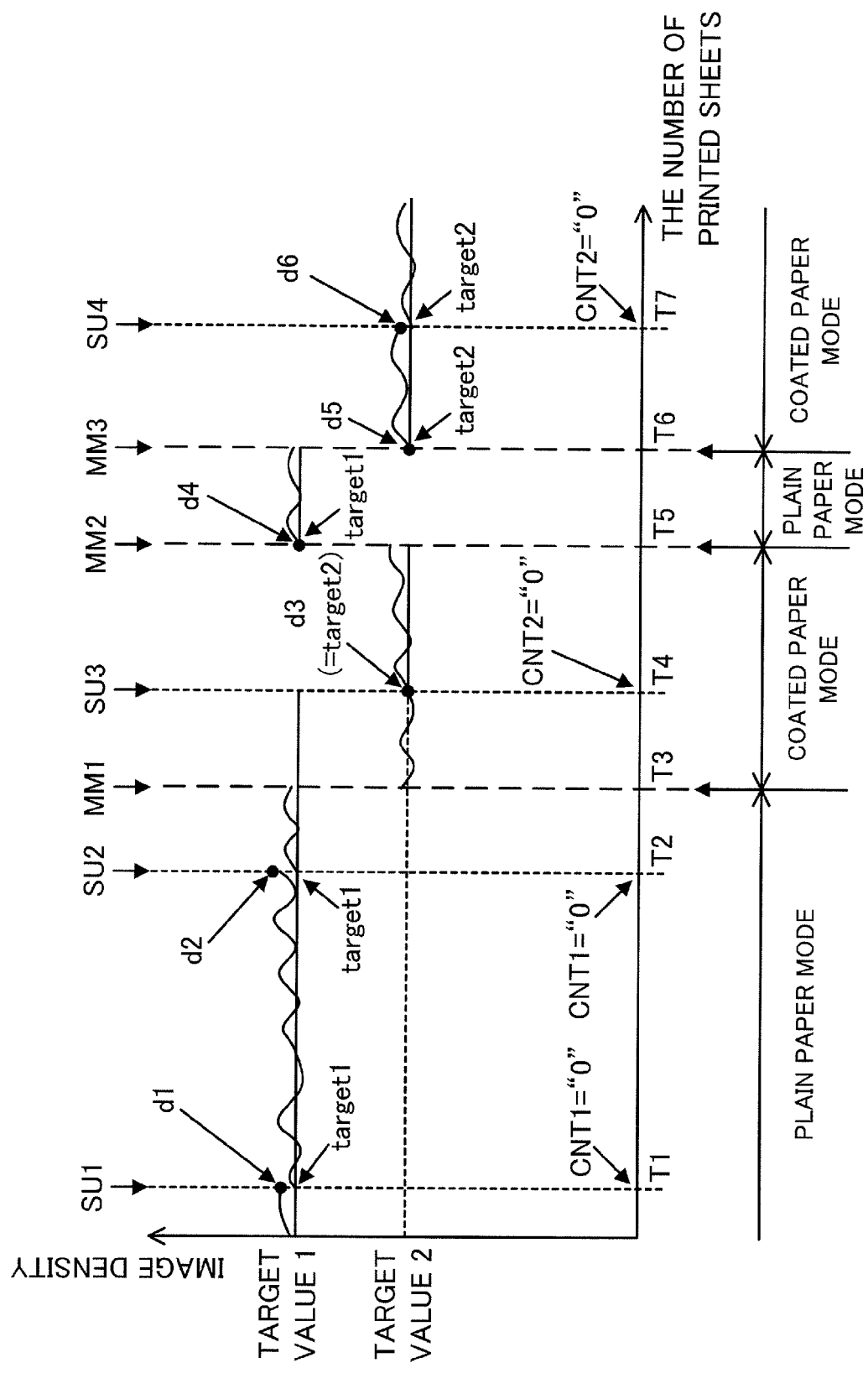
FIG. 12 is a view for explaining timings of performing the setup processing during image forming operation.

FIG. 12 is a view for explaining timings of performing the setup processing during image forming operation (here, also simply referred to as "setup processing"). At first, at a time T1, the setup processing (SU1) in a state where, for example, the plain paper mode is set is performed. Here, the setup processing at the time T1 is assumed to be the second or subsequent setup processing after the plain paper mode is set. Accordingly, at the time T1, the following setup processing is performed. Specifically, the detected density value (d1) of each of the reference density patterns for each color detected by the reference density detection sensor 55 is compared with the corresponding target value 1 (target 1) for the image density in the plain paper mode stored in the EEPROM 604 in the controller 60. Then, according to the comparison result, the detected humidity value and the detected temperature value, the output light amount value of the semiconductor laser 27 is corrected to be the output light amount value LD1 so that the image density would be the target value 1. At this time, the sheet-number counter CNT1 is reset to "0."

When the plain paper mode is kept set, the next setup processing (SU2) is performed at a time T2 when the measured value of the cumulative number of printed sheets measured by the sheet-number counter CNT1 for the plain paper mode reaches a certain value predetermined as the interval for the setup processing in the plain paper mode. At the time T2, the setup processing is performed in the same procedure as that at the time T1. Specifically, the detected density value (d2) is compared with the target value 1 (target 1), and then the output light amount value of the semiconductor laser 27 is corrected to be the output light amount value LD1 so that the image density would be the target value 1. At this time, the sheet-number counter CNT1 is reset to "0."

Thereafter, assume that the plain paper mode is then changed to the coated paper mode at a time T3 before the measured value of the cumulative number of printed sheets measured by the sheet-number counter CNT1 reaches the interval (certain value) for the setup processing (MM1).

At a time T4 when the measured value of the cumulative number of printed sheets measured by the sheet-number counter CNT2 reaches the predetermined value (certain value) as the interval for the setup processing in the coated paper mode, the first setup processing (SU3) after the change to the coated paper mode is performed. Accordingly, at the time T4, the following setup processing is performed. Specifically, the detected density value (d3) of each of the reference density patterns for each color detected by the reference density detection sensor 55 is set as the target value 2 (target 2) for the image density. Then, the target value 2 is stored in the EEPROM 604 in the controller 60, and the output light amount value of the semiconductor laser 27 is set to the output light amount value LD2 so that the image density would be the target value 2. Moreover, at this time, the sheet-number counter CNT2 is reset to "0."

Here, the sheet-number counter CNT1 for the plain paper mode is reset to "0" when the setup processing in the plain paper mode is performed, while the sheet-number counter CNT2 for the coated paper mode is reset to "0" when the setup processing in the coated paper mode is performed. However, after being reset, the sheet-number counters CNT1 and CNT2 each continue to measure the number of printed sheets.

Assume that, after the first setup processing (SU3) at the time T4 since the change to the coated paper mode (MM1), the coated paper mode is again changed to the plain paper mode at a time T5 (MM2) before the measured value of the cumulative number of printed sheets measured by the sheet-number counter CNT2 reaches the interval for the setup processing. At this time (time T5), the measured value of the cumulative number of printed sheets measured by the sheet-number counter CNT1 for the plain paper mode is assumed not to reach the interval (certain value) for the setup processing in the plain paper mode. For this reason, at the time T5, the target value 1 (target 1) for the image density in the plain paper mode stored in the EEPROM 604 in the controller 60 is regarded as the detected density value (d4). Thus, the output light amount value LD1 of the semiconductor laser 27 emitted to the corresponding photoconductive drum 31 from the laser exposure device 26 is calculated by using the output light amount table determining the correspondence of the output light amount with each of the detected density value (d4=target value 1), the detected humidity value and the detected temperature value. Thereby, the output light amount value LD1 of the semiconductor laser 27 is corrected so that the image density would be the target value 1.

Here, the sheet-number counter CNT1 continues to count the number of printed sheets without being reset to "0."

Subsequently, assume that, after the setup processing at the time T5, the plain paper mode is again changed to the coated paper mode at a time T6 (MM3) before the measured value of the cumulative number of printed sheets measured by the sheet-number counter CNT1 reaches the interval (certain value) for the setup processing. At this time (time T6), the measured value of the cumulative number of printed sheets measured by the sheet-number counter CNT2 for the coated paper mode does not reach the interval (certain value) for the setup processing in the coated paper mode. For this reason, at the time T6, the target value 2 for the image density in the coated paper mode stored in the EEPROM 604 in the controller 60 is regarded as the detected density value (d5). Thus, the output light amount value LD2 of the semiconductor laser 27 emitted to the corresponding photoconductive drum 31 from the laser exposure device 26 is calculated by using the output light amount table determining the correspondence of the output light amount with each of the detected density value (d5=target value 2), the detected humidity value and the detected temperature value. Thereby, the output light amount value of the semiconductor laser 27 is corrected to be the output light amount value LD2 so that the image density would be the target value 2.

Here, the sheet-number counter CNT2 continues to measure the number of printed sheets without being reset to "0."

Thereafter, at a time T7 when the measured value of the cumulative number of printed sheets measured by the sheet-number counter CNT2 has reached the interval for the setup processing, the setup processing in a state where the coated paper mode is set is performed (SU4). The setup processing at the time T7 is the second or subsequent setup processing after the coated paper mode is set. Accordingly, the detected density value (d6) of each of the reference density patterns for each color detected by the reference density detection sensor 55 is compared with the corresponding target value 2 (target 2) for the image density in the coated paper mode stored in the EEPROM 604 in the controller 60. Then, according to the comparison result, the detected humidity value and the detected temperature value, the output light amount value of the semiconductor laser 27 is corrected to be the output light amount value LD2 so that the image density would be the target value 2. At this time, the sheet-number counter CNT2 is reset to "0."

As described above, the controller 60 of the second exemplary embodiment performs the setup processing when the value of the cumulative number of printed sheets measured by the sheet-number counter CNT1 or CNT2 reaches the certain interval (certain value) set for the corresponding one of the plain paper mode and the coated paper mode. In this way, the controller 60 optimizes the timings of performing the setup processing to enhance the image productivity. Moreover, the variation in the image density in the same image forming mode is reduced by correcting (adjusting) the various image forming conditions through the setup processing according to the various conditions.

Here, consider a case where the detected density value of each of the reference density patterns for each color detected by the reference density detection sensor 55 in each kind of the setup processing has a difference beyond a predetermined range (certain range) from the corresponding target value for the image density for the corresponding one of the image forming modes stored in the EEPROM 604 in the controller 60. To deal with this case, the controller 60 may be configured to perform more precise setup processing by using reference density patterns for each color with a larger number of tone variations than those shown in FIG. 6, for example. Otherwise, in this case, the controller 60 may also be configured to repeat the execution of the setup processing using the reference density patterns for each color shown in FIG. 6 two times or more. Instead, the controller 60 may be configured to set a larger correction amount for each of the various image forming conditions in the setup processing than usual.

Heretofore, the description have been given of the case where the controller 60 of the second exemplary embodiment forms the reference density patterns for each color as the state quantities each indicting the state of an image formed by the corresponding one of the image formation units 30, and then performs the setup processing by using the detected density value of each of the reference density patterns for each color detected by the reference density detection sensor 55. In addition to the detected density values of the reference density patterns for each color, other kinds of state quantities each indicating the state of an image are also usable to perform the setup processing. One usable state quantity is the surface potential of the photoconductive drum 31 that is detected by the potential sensor 68 and indicates the state of an electrostatic latent image formed on the photoconductive drum 31. Instead, though not being exactly the state quantity indicating the state of an image, the surface potential of the photoconductive drum 31 is also usable which is detected after the photoconductive drum 31 is charged by the charging roll 32 and before an electrostatic latent image is formed. As the surface potential, a dark area potential, an intermediate potential and a light area potential, which are latent image potentials, are usable. In this case, as the image forming conditions, controlled are the output light amount value of the semiconductor laser 27 in the laser exposure device 26, the value of the charge bias voltage supplied to the charging roll 32, and the value of the developing bias voltage applied to the developing roll 34.

Moreover, the toner density detection value detected by the toner density sensor 69, which is an example of the density detection unit, is also usable, though it is also not the state quantity indicating the state of an image. In this case, as the image forming conditions, controlled are the output light amount value of the semiconductor laser 27 in the laser exposure device 26, the value of the charge bias voltage supplied to the charging roll 32, the value of the developing bias voltage applied to the developing roll 34, and the amounts of color toners refilled respectively in the developing devices 33.

The toner density detection value detected by the toner density sensor 69 is outputted as different values before and after the change in the image forming mode because the rotation speeds of the developing roll 34 and a transportation screw (not shown in the figure) in each of the developing devices 33 are changed with the change in the image forming mode.

In addition, the setup processing may be performed by using, as the state quantity indicating the state of an image, at least one of a detected density value and a detected color value of each of the reference density patterns for each color formed on the paper sheet P. In this case, as the image forming conditions, controlled are the output light amount value of the semiconductor laser 27 in the laser exposure device 26, the value of the charge bias voltage supplied to the charging roll 32, the value of the developing bias voltage applied to the developing roll 34, the surface temperature, the fixing speed and the nip pressure of the fixing roll 82 of the fixing device 80, and the value of the transfer bias voltage applied to the primary transfer roll 42.

Note that an employable method of forming the reference density patterns for each color on the intermediate transfer belt 41 or the paper sheet P is a method in which the controller 60 forms the patterns by reading reference density pattern data stored in the external memory 90, a method in which the controller 60 forms the patterns by reading a certain reference density chart from an image capturing apparatus (not shown in the figure), or another equivalent method.

As has been described above, in the image forming apparatus 1 of the second exemplary embodiment, the interval of performing the setup processing is set for each of the image forming modes, and the image forming apparatus 1 is configured to perform the setup processing when, for example, the measured value of the cumulative number of printed sheets in each of the image forming modes reaches the corresponding set interval. Moreover, when the image forming mode is changed, the detected density value of each of the reference density patterns for each color, which is an example of information detected at least in the first setup processing in the newly-set image forming mode, is set as the target value for the image density in the newly-set image forming mode. With this configuration, the timing of performing the setup processing is optimized, thereby enhancing the image productivity. Further, a variation in image density in the same image forming mode is reduced to a small amount.

[Third Exemplary Embodiment]

In the second exemplary embodiment, the description has been given of the configuration in which, when the image forming mode is changed, the detected density value of each of the reference density patterns for each color is set as the target value for the image density in the newly-set image forming mode. Here, the detected density value is an example of the information detected in the first setup processing in the newly-set image forming mode. In the third exemplary embodiment, description will be given of a configuration in which a certain one of the image forming modes is set as a standard mode. More specifically, in this configuration, when the image forming mode is changed from the standard mode to another mode other than the standard mode, the detected density value of each of the reference density patterns for each color is set as the target value for the image density in the newly-set image forming mode. Here, the detected density value is also an example of the information detected in the first setup processing in the newly-set image forming mode. Incidentally, the same reference numerals are given to the same components as those in the second exemplary embodiment, and the detailed explanation thereof is omitted here.

An image forming apparatus 1 of the third exemplary embodiment is configured to have a certain one of the image forming modes set as a standard mode. Specifically, a controller 60 includes: a standard mode input function that sets, as the standard mode, an image forming mode on the basis of an instruction inputted by the user by using an operation input unit (not shown in the figure), for example; and an automatic setting function that sets, as the standard mode, one of the image forming modes selected in accordance with a predetermined criterion.

Moreover, the controller 60 includes, as a measuring unit that measures a time period elapsed after the last adjustment of the image forming conditions (setup processing): a sheet-number counter CNT1 that measures the cumulative number of printed sheets after the previous (last) setup processing in a state where the standard mode is set; and a sheet-number counter CNT2 that measures the cumulative number of printed sheets after the previous (last) setup processing in a state where an image forming mode other than the standard mode is set. Besides the cumulative number of printed sheets, examples of the time period here include the number of rotations of each photoconductive drum 31, a moving distance of the surface of each photoconductive drum 31, the number of printed sheets, a printing time period, a time period of rotations of each photoconductive drum 31, a charging time period of the charging roll 32, and an actual time period, each of which is accumulated after the last adjustment of the image forming conditions.

Figure 13:
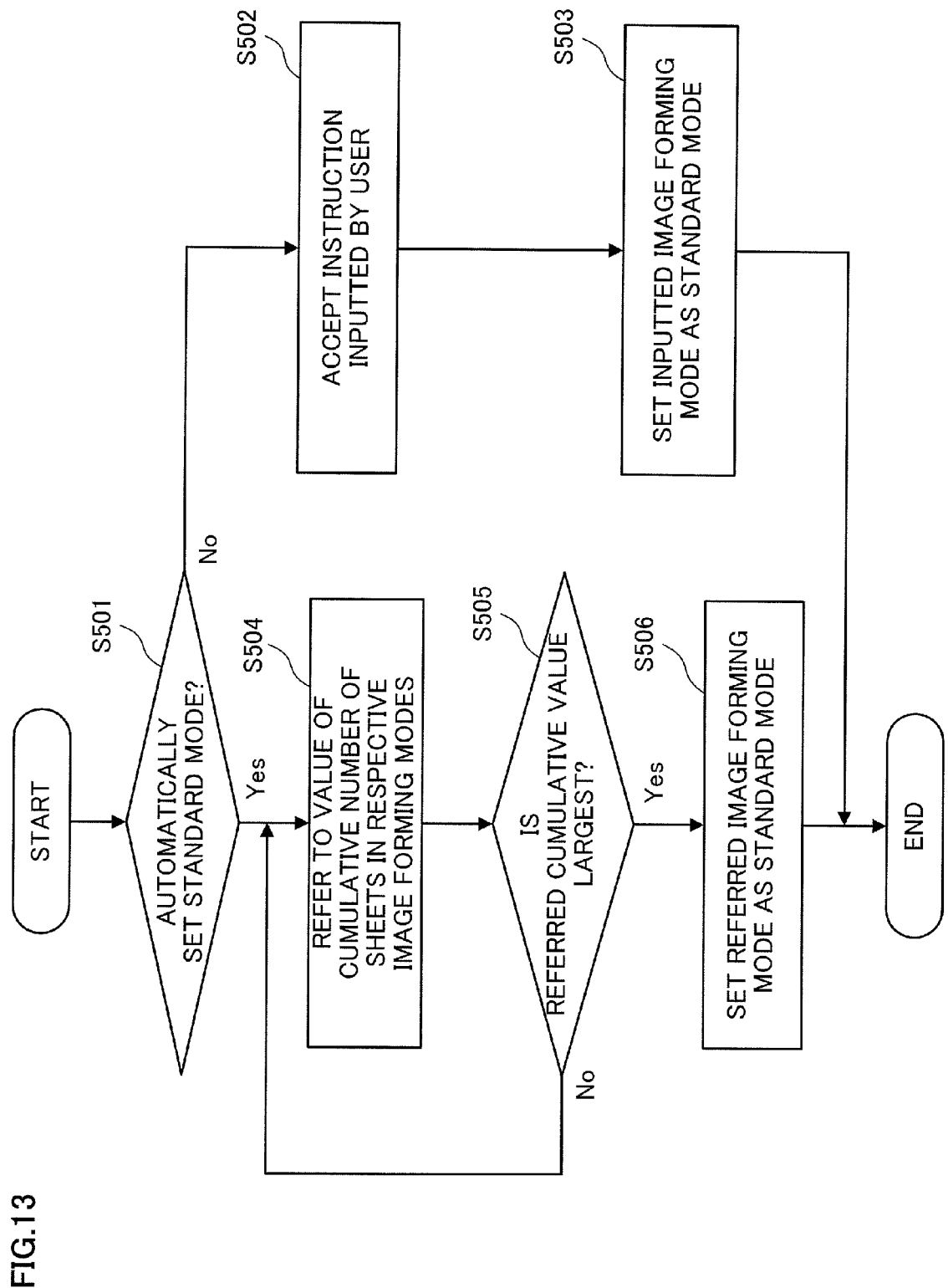
FIG. 13 is a flowchart showing an example of the procedure of the processing in which the controller sets the standard mode.

FIG. 13 is a flowchart showing an example of the procedure of the processing in which the controller 60 sets the standard mode. As shown in FIG. 13, the controller 60 lets the user select whether to set, as the standard mode, an image forming mode on the basis of an instruction inputted by the user by using the operation input unit (not shown in the figure) of the image forming apparatus 1, or to automatically set, as the standard mode, one of the image forming modes selected in accordance with the predetermined criterion (S501).

When the user selects the mode of setting the standard mode through a user instruction in step 501, the controller 60 accepts an instruction inputted by the user through the operation input unit (S502), and sets the inputted image forming mode as the standard mode (S503). Here, the controller 60 is configured to let the user to specify, for example, a type of paper sheets P (uncoated paper or coated paper, for example) through the operation input unit, and to set, as the standard mode, an image forming mode corresponding to the specified type of paper sheets P. In addition, an action in which the user specifies, for example, a type of paper sheets P may also be regarded as an action of selecting the mode of setting the standard mode on the basis of an inputted instruction in step 501.

On the other hand, when the user selects the mode of automatically setting, as the standard mode, one of the image forming modes selected in accordance with the predetermined criterion in step 501, the controller 60 refers to the value of the cumulative number of printed sheets by each of the sheet-number counters CNT1 and CNT2 in the respective image forming modes (S504), and determines which one of the image forming modes has the largest value of the cumulative number (referred cumulative value) of the printed sheets between those measured by the sheet-number counters CNT1 and CNT2 (S505). Then, the controller 60 sets, as the standard mode, the image forming mode (referred image forming mode) determined as the one having the largest value of the cumulative number of the printed sheets (S506).

Specifically, consider a case where the setting has a "plain paper mode" using plain paper, which is an example of uncoated paper, and a "coated paper mode" using coated paper as the paper sheets P. In this case, a comparison is made between the cumulative number of printed sheets measured by the sheet-number counter CNT1 in the plain paper mode and the cumulative number of printed sheets measured by the sheet-number counter CNT2 in the coated paper mode. When the comparison result shows that the cumulative number in the plain paper mode is larger than that in the coated paper mode, for example, the plain paper mode is set as the standard mode.

In addition, in the image forming apparatus 1 of the third exemplary embodiment, in the case where the image forming mode is changed from a mode other than the standard mode to the standard mode, the setup processing based on the pre-stored target value for the image density is performed at a timing when the value of the cumulative number of printed sheets after the previous setup processing measured by the sheet-number counter CNT1 for the standard mode exceeds a certain interval set for the standard mode, and additionally at a timing when the image forming mode is changed, if necessary.

In contrast, in the case where the image forming mode is changed from the standard mode to a mode other than the standard mode, the setup processing is performed at a timing when the value of the cumulative number of printed sheets after the previous setup processing measured by the sheet-number counter CNT2 for the mode other than the standard mode reaches a certain interval set for this mode for the first time. In this setup processing, the density value of each of the reference density patterns for each color detected in the setup processing is set as the target value for the image density at the newly-set image forming mode through the change. Then, the setup processing based on the set target value is performed.

Figure 14:
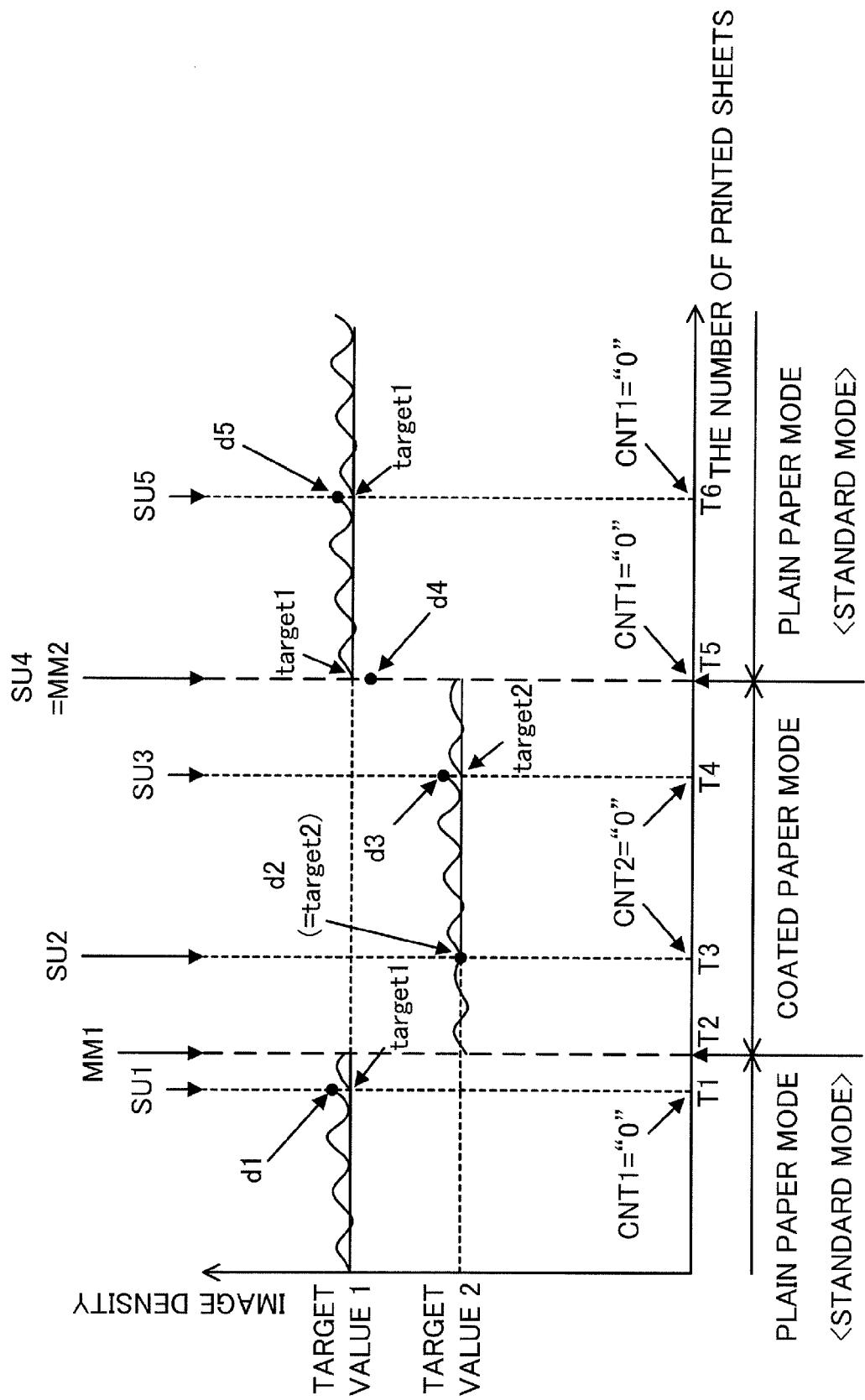
FIG. 14 is a view for explaining timings of performing the setup processing during image forming operation and operation in the setup processing.

Here, FIG. 14 is a view for explaining timings of performing the setup processing during image forming operation (here, also simply referred to as "setup processing") and operation in the setup processing. In FIG. 14, the plain paper mode is set as the standard mode.

First, the plain paper mode, which is the standard mode, is set, and, at a time T1, the setup processing (SU1) is performed in a state where the plain paper mode is set. Here, the setup processing at the time T1 is assumed to be the second or subsequent setup processing after the plain paper mode is set. Accordingly, at the time T1, the following setup processing is performed. Specifically, the detected density value (d1) of each of the reference density patterns for each color detected by a reference density detection sensor 55 is compared with the corresponding target value 1 (target 1) for the image density in the plain paper mode stored in an EEPROM 604 in the controller 60. Then, according to the comparison result, a detected humidity value and a detected temperature value, an output light amount value of a semiconductor laser 27 is corrected to be an output light amount value LD1 so that the image density would be the target value 1. The set output light amount value LD1 is stored in the EEPROM 604 as an output light amount value LD1_old. At this time, the sheet-number counter CNT1 is reset to "0."

Here, the sheet-number counter CNT1 for the standard mode (plain paper mode) is reset to "0" when the setup processing in the standard mode is performed, while the sheet-number counter CNT2 for the coated paper mode is reset to "0" when the setup processing in the coated paper mode is performed. However, after being reset, the sheet-number counters CNT1 and CNT2 each continue to measure the number of printed sheets.

Assume that the standard mode is changed to the coated paper mode, which is a mode other than the standard mode, at a time T2 after the time T1 and before the measured value of the cumulative number of printed sheets measured by the sheet-number counter CNT1 reaches the interval for the setup processing (MM1). At the time T2, the setup processing is not performed.

At a time T3 when the measured value of the cumulative number of printed sheets measured by the sheet-number counter CNT2 reaches the interval (certain value) set for the setup processing in the coated paper mode, the first setup processing (SU2) after the change to the coated paper mode is performed. Accordingly, at the time T3, the following setup processing is performed. Specifically, since the setup processing (SU2) at the time T3 is the setup processing in the mode other than the standard mode, a detected density value (d2) of each of reference density patterns for each color detected by the reference density detection sensor 55 is set as a target value 2 (target 2) for the image density. Then, the target value 2 is stored in the EEPROM 604 in the controller 60, and an output light amount value of the semiconductor laser 27 is set to an output light amount value LD2 so that the image density would be the target value 2. At this time, the sheet-number counter CNT2 is reset to "0."

After the first setup processing at the time T3, the second setup processing (SU3) in the coated paper mode is performed at a time T4 when the measured value of the cumulative number of printed sheets measured by the sheet-number counter CNT2 reaches the interval (certain value) for the setup processing. Accordingly, in the setup processing at the time T4, the detected density value (d3) of each of the reference density patterns for each color detected by the reference density detection sensor 55 is compared with the corresponding target value 2 (target 2) for the image density in the coated paper mode stored in the EEPROM 604 in the controller 60 at the time T3. On the basis of the comparison result, the detected humidity value and the detected temperature value, the output light amount value of the semiconductor laser 27 is corrected to be the output light amount value LD2 so that the image density would be the target value 2. At this time, the sheet-number counter CNT2 is reset to "0."

Thereafter, assume that the coated paper mode is again changed to the standard mode (plain paper mode) at a time T5 (MM2) before the measured value of the cumulative number of printed sheets measured by the sheet-number counter CNT2 reaches the interval for the setup processing. The setup processing performed at this time (time T5) is the setup processing in the standard mode. Thus, the setup processing (SU4) is performed even if the measured value of the cumulative number of printed sheets measured by the plain paper mode sheet-number counter CNT1 has not reached the interval for the setup processing in the plain paper mode yet. In the setup processing at the time T5 where the coated paper mode is changed to the standard paper mode, the detected density value (d4) of each of the reference density patterns for each color detected by the reference density detection sensor 55 is compared with the corresponding target value 1 (target 1) for the image density for the plain paper mode pre-stored in the EEPROM 604 in the controller 60. On the basis of the comparison result, the detected humidity value and the detected temperature value, the output light amount value of the semiconductor laser 27 is corrected to be the output light amount value LD1 so that the image density would be the target value 1. At this time, the sheet-number counter CNT1 is reset to "0."

Assume that, after the setup processing (SU4) at the time T5, the second setup processing (SU5) after the change to the standard mode (plain paper mode) is performed at a time T6 when the measured value of the cumulative number of printed sheets measured by the sheet-number counter CNT1 reaches the interval for this setup processing. Hence, in the setup processing (SU5) at the time T6, a detected density value (d5) of each of the reference density patterns for each color detected by the reference density detection sensor 55 is compared with the corresponding target value 1 (target 1) for the image density in the plain paper mode stored in the EEPROM 604 in the controller 60. On the basis of the comparison result, the detected humidity value and the detected temperature value, the output light amount value of the semiconductor laser 27 is corrected to be the output light amount value LD1 so that the image density would be the target value 1. At this time, the sheet-number counter CNT1 is reset to "0."

As described above, in the image forming apparatus 1 of the third exemplary embodiment, the certain image forming mode is set as the standard mode. Then, when the image forming mode is changed from a mode other than the standard mode to the standard mode, the setup processing based on the pre-stored target value for the image density is performed. In contrast, when the image forming mode is changed from the standard mode to the mode other than the standard mode, the density value of each of the reference density patterns for each color is detected in the first setup processing after the change to the other image forming mode, and the detected density value is set as the target value for the image density in the newly-set image forming mode through the change. Then, the setup processing based on the newly-set target value is performed. This setup processing reduces a variation in image density in the same image forming mode. In addition, as for a frequently-used mode such as the plain paper mode, this setup processing reduces a variation in image density between previous printing and next printing in the plain paper mode, even though printing in another image forming mode is performed between the previous printing and the next printing in the plain paper mode.

Moreover, in the image forming apparatus 1 of the third exemplary embodiment, the setup processing in each of the standard mode and an image forming mode other than the standard mode is performed at a timing when the value of the cumulative number of printed sheets measured by the sheet-number counter CNT1 or CNT2 reaches the predetermined interval (certain value) determined for the corresponding image forming mode. In this case, the interval for the setup processing in the image forming mode other than the standard mode, for example, in a less-frequently used image forming mode may be set longer than that in the standard mode (plain paper mode) that is used more frequently. Such a longer interval leads to a reduction in the number of executions of the setup processing in the less-frequently used image forming mode, and thereby further improves the image productivity.

However, the image forming apparatus 1 may be configured to perform the setup processing at timing when the image forming mode is changed from a mode other than the standard mode to the standard mode. Moreover, in this case, the image forming apparatus 1 may also be configured to perform the setup processing at the time of changing the mode only when an environment value such as humidity or temperature is beyond a predetermined range.

In addition, when the image forming mode is changed from a mode other than the standard mode to the standard mode (for example, MM2 in FIG. 14), an output light amount value LD of the semiconductor laser 27 may be set in the following method.

For instance, here, the method is explained by taking the case shown in FIG. 14 as an example. When the setup processing is performed two or more times in the coated paper mode before the image forming mode is changed to the standard mode, the output light amount value LD2 of the semiconductor laser 27 set in the first setup processing (the setup processing SU2 at the time T3) in this coated paper mode is stored as LD2_S in the EEPROM 604 in the controller 60. Similarly, the output light amount value LD2 of the semiconductor laser 27 set in the last setup processing (the setup processing SU3 at the time T4) in this coated paper mode is stored as LD2_E in the EEPROM 604 in the controller 60.

Then, a mathematical operation with the following expression (1) is performed by using both the output light amount values LD2_S and LD2_E stored in the coated paper mode, and the output light amount value LD1_old that is set in the last setup processing (the setup processing SU1 at the time T1) in the previous standard mode and stored in the EEPROM 604. Thereby, the output light amount value LD1 of the semiconductor laser 27 when the image forming mode is again changed to the standard mode (at the time T5 in FIG. 14) is set. Specifically, $$LD1 = LD1\_old + K \cdot (LD2\_E - LD2\_S) \quad (1),$$

where K denotes a correction coefficient.

Incidentally, an output light amount value LD1_old' that is set before the last setup processing (the setup processing SU1 at the time T1) in the previous standard mode and stored in the EEPROM 604 may also be used as the output light amount value LD1_old.

It is conceivable that the output light amount value LD of the semiconductor laser 27 in the standard mode (plain paper mode) immediately after the change from the coated paper mode varies according to variations in the output light amount value LD of the semiconductor laser 27 in the coated paper mode before the change to the standard mode. For this reason, a value obtained by multiplying, by the certain correction coefficient K, a variation amount (LD2_E–LD2_S) of the output light amount value LD of the semiconductor laser 27 in the coated paper mode before the change to the standard mode is added to the output light amount value LD1_old set in the last place in the previous standard mode. By performing the operation, obtained is a highly-accurate estimated value for the output light amount value LD1 of the semiconductor laser 27 after the image forming mode is again changed to the standard mode. The use of this method allows the output light amount value LD of the semiconductor laser 27 to be quickly set when the image forming mode is changed to the standard mode, and thereby leads to an improvement in image productivity.

Moreover, the image forming apparatus 1 of the third exemplary embodiment performs the following setup processing in the standard mode. Specifically, the reference density patterns, for example, of 6 tones for each color shown in FIG. 6 are formed firstly. Then, according to the density values of the respective reference density patterns of 6 tones for each color detected by the reference density detection sensor 55, the image forming conditions are corrected so as to accurately adjust the image density. On the other hand, in an image forming mode other than the standard mode, simplified setup processing (simple setup processing) with lower correction accuracy than in the standard mode may be preformed. In the simple setup processing, the image density is adjusted by forming reference density patterns of a smaller number of tones for each color than those of the reference density patterns shown in FIG. 6.

Figure 15:
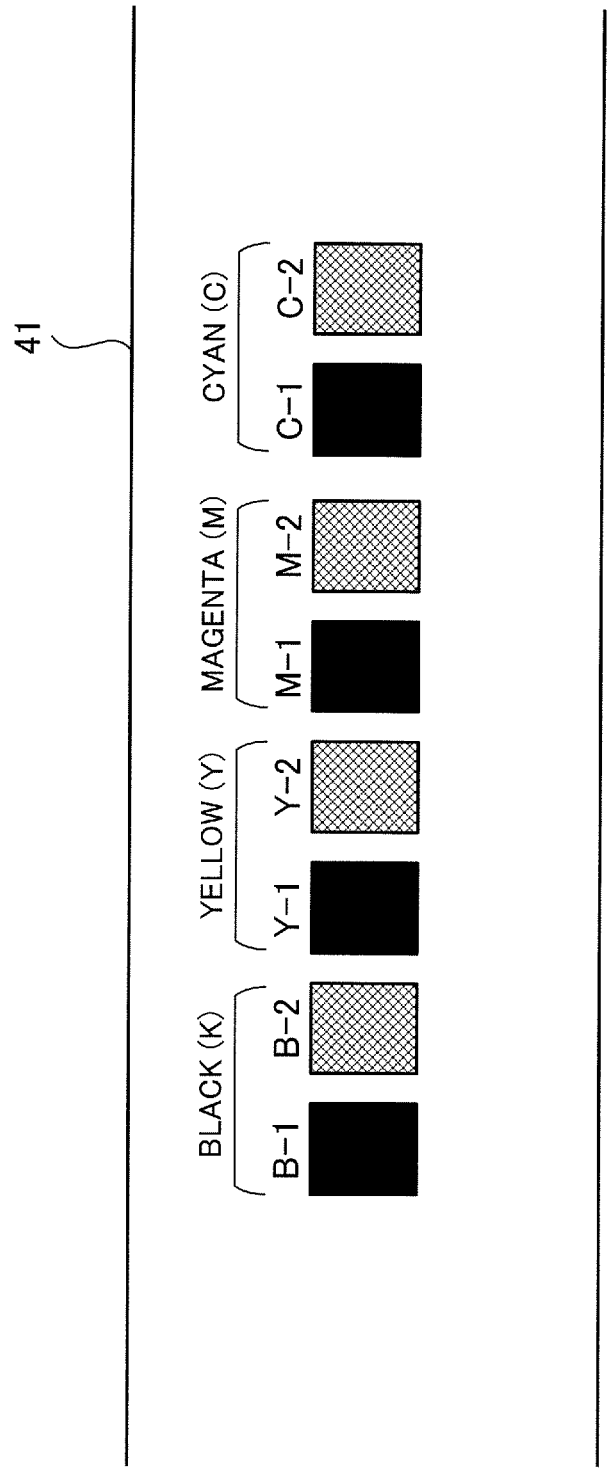
FIG. 15 is a diagram showing an example of the reference density patterns used in the simple setup processing in an image forming mode other than the standard mode.

FIG. 15 is a diagram showing an example of the reference density patterns used in the simple setup processing in an image forming mode other than the standard mode. FIG. 15 shows the example in which reference density patterns of two tones are formed in each of the image formation units 30. For example, reference density patterns B-1 and B-2 of two tones are formed in the black (K) image formation unit 30K. Similarly, reference density patterns Y-1 and Y-2 of two tones are formed in the yellow (Y) image formation unit 30Y, reference density patterns M-1 and M-2 of two tones are formed in the magenta (M) image formation unit 30M, and reference density patterns C-1 and C-2 of two tones are formed in the cyan (C) image formation unit 30C).

The simple setup processing using these reference density patterns is performed in a shorter time than the normal setup processing using the reference density patterns shown in FIG. 6 (normal setup processing). The use of the simple setup processing reduces a time required for the setup processing in the less-frequently used image forming mode, and thereby further improves image productivity.

Moreover, when the simple setup processing is employed, correction amounts for various image forming conditions calculated in the simple setup processing may be set smaller than those in the normal setup processing.

For example, assume that both the normal setup processing and the simple setup processing have the same difference $\Delta\delta$ between the detected density value of each of the reference density patterns for each color detected by the reference density detection sensor 55 and its target value stored in the EEPROM 604 in the controller 60.

On this assumption, an operation of $f(\Delta\delta)$ based on the difference $\Delta\delta$ is performed to figure out the correction amount in each of the image forming conditions. For instance, an operation of $f_1(\Delta\delta)$ is performed to figure out the correction amount for an image forming condition (for example, the output light amount value LD of the semiconductor laser 27) in the normal setup processing, and an operation of $f_2(\Delta\delta)$ is performed to figure out the correction amount for the same image forming condition in the simple setup processing. In this case, the controller 60 sets the operations of $f_1(\Delta\delta)$ and $f_2(\Delta\delta)$ in the normal setup processing and the simple setup processing, respectively, to satisfy the following expression (2).

$$f_1(\Delta\delta) > f_2(\Delta\delta) \tag{2}$$

In this way, the sensitivity in the correction for the difference $\Delta\delta$ between the detected density value of each of the reference density patterns for each color, and the target value stored in the EEPROM 604 in the controller 60 is set smaller in the simple setup processing with low correction accuracy than in the normal setup processing. This prevents the setting value of each of the image forming conditions in the simple setup processing from deviating largely from the target value.

Figure 16A:
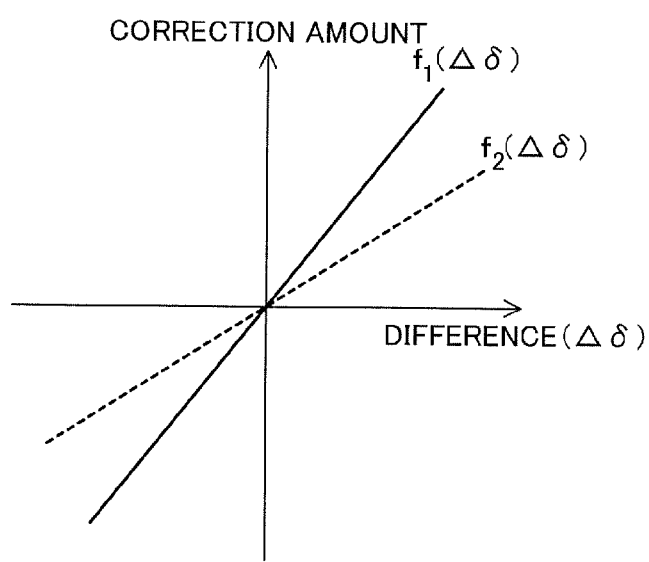
FIGS. 16A to 16C are graphs showing specific examples of the operations to figure out the correction amounts in the normal setup processing and the simple setup processing.
Figure 16B:
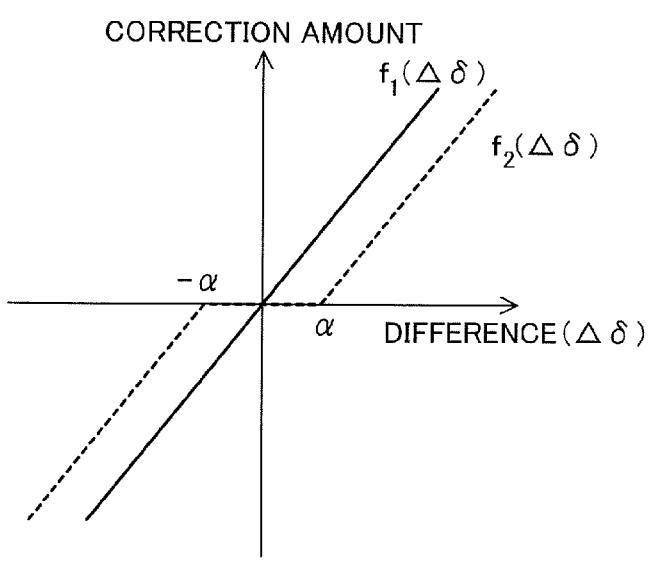
Figure 16C:
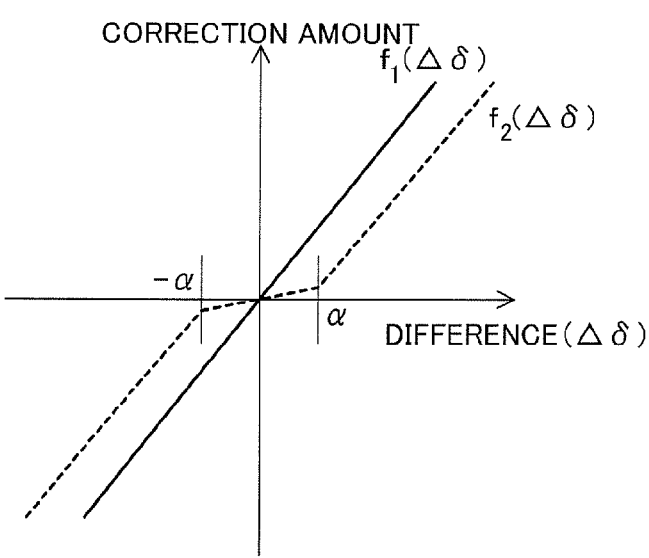

FIGS. 16A to 16C are graphs showing specific examples of the operations of $f(\Delta\delta)$ to figure out the correction amounts in the normal setup processing and the simple setup processing. FIG. 16A shows a case where a linear function is used for the operation of $f(\Delta\delta)$, FIG. 16B shows a case where a non-correction region in which the correction amount is set to 0 is provided in a range having a small difference $\Delta\delta(-\alpha \leq \Delta\delta \leq \alpha)$ in the operation of $f_2(\Delta\delta)$ for figuring out the correction amount in the simple setup processing, and FIG. 16C shows a case where a small correction amount region in which the correction amount is set smaller is provided in a range having a small difference $\Delta\delta(-\alpha \leq \Delta\delta \leq \alpha)$ in the operation of $f_2(\Delta\delta)$ for figuring out the correction amount in the simple setup processing.

By using the operations of $f_1(\Delta\delta)$ and $f_2(\Delta\delta)$ shown in FIGS. 16A to 16C, the controller 60 prevents the setting value of each of the image forming conditions from deviating largely from the target value in the simple setup processing.

As described above, in the image forming apparatus 1 of the third exemplary embodiment, a certain image forming mode is set as the standard mode, and the setup processing based on the pre-stored target value for the image density is performed when the image forming mode is changed from a mode other than the standard mode to the standard mode. In contrast, when the image forming mode is changed from the standard mode to a mode other than the standard mode, the first setup processing after the change to the other image forming mode is performed as follows. The density value of each of the reference density patterns for each color is detected in the setup processing, and then the detected density value is set as the target value for the image density in the newly-set image forming mode through the change. Thereafter, the setup processing based on the newly-set target value is performed.

This reduces a variation in image density in the same image forming mode. In addition, as for a frequently-used mode such as the plain paper mode, this setup processing reduces a variation in image density between previous printing and next printing in the plain paper mode, even if printing in another image forming mode is performed between the previous printing and the next printing in the plain paper mode.

Further, the contents in the setup processing are optimized corresponding to a timing of performing the setup processing, thereby improving image productivity.

[Fourth Exemplary Embodiment]

In the first exemplary embodiment, is the description has been given of the configuration in which the interval (certain value) at which the setup processing is performed is set for each image forming mode, and the setup processing is performed when the measured value of the cumulative number of printed sheets after the previous setup processing in one of the image forming modes reaches the predetermined value (certain value). In the fourth exemplary embodiment, description will be given of a configuration in which the measured value of the cumulative number of printed sheets, a time and the like are calculated by weighting, for each image forming mode, the measured value of a sheet-number counter CNT for a corresponding image forming mode, and determination whether or not to perform setup processing is performed depending on whether or not the calculated value has reached a certain value. Incidentally, the same reference numerals are given to the same components as those in the first exemplary embodiment, and the detailed explanation thereof is omitted here.

For example, in step 203 and step 207 in the setup processing shown in FIG. 4 in the first exemplary embodiment, step 303 and step 315 in the start-up setup processing and the ending setup processing shown in FIG. 10, and step 402 and step 414 in the setup processing during image forming operation and the ending setup processing shown in FIG. 11, a controller 60 of the fourth exemplary embodiment determines whether or not to perform the setup processing as follows.

Specifically, the controller 60 of the fourth exemplary embodiment performs a mathematical operation to weight differently a measured value of a sheet-number counter CNT1 for a plain paper mode and a measured value of a sheet-number counter CNT2 for a coated paper mode, for example. Then, by regarding the operation results respectively as the measured values of the sheet-number counters CNT1 and CNT2, the controller 60 determines whether or not to perform the setup processing.

Figure 17:
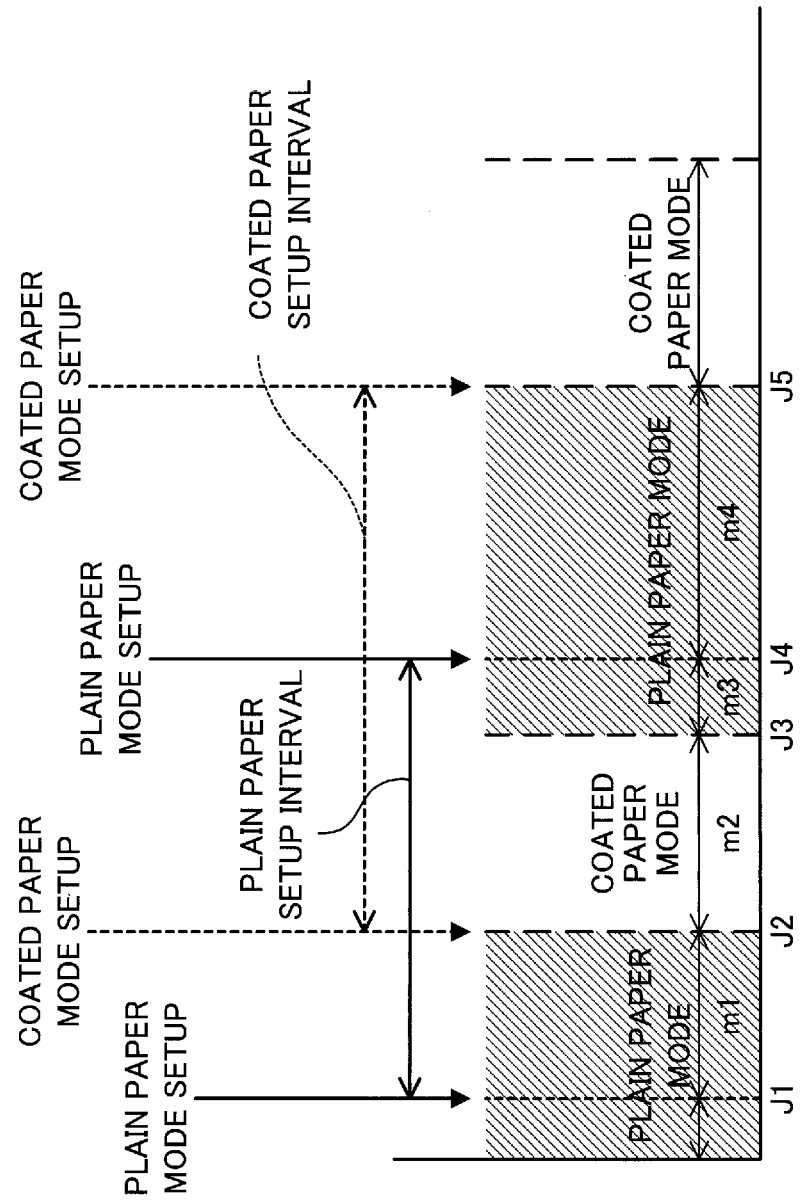
FIG. 17 is a view for explaining the processing for determining whether or not to perform the setup processing, performed by the controller.

FIG. 17 is a view for explaining the processing for determining whether or not to perform the setup processing, performed by the controller 60 of the fourth exemplary embodiment. In FIG. 17, assume that, first, the setup processing in the plain paper mode (plain paper mode setup) is performed at a time J1, and the setup processing in the coated paper mode (coated paper mode setup) is performed at a time J2. Accordingly, the sheet-number counter CNT1 for the plain paper mode is reset to "0" at the time J1, and then starts to measure the number of printed sheets again from 0. The sheet-number counter CNT2 for the coated paper mode is reset to "0" at the time J2, and then starts to measure the number of printed sheets again from 0.

Then, the image forming mode is assumed to be changed from the coated paper mode to the plain paper mode at a time J3. In this case, the controller 60 uses a result obtained by performing a mathematical operation with the following expression (3), as the measured value of the number of printed sheets measured by the sheet-number counter CNT1 for the plain paper mode from the time J1 when the sheet-number counter CNT1 started the measurement. Specifically, a measured mathematical value CNT1' of the sheet-number counter CNT1 at the time J3 is $$CNT1' = m1 \times a1 + m2 \times b1 \tag{3}$$

where m1 is the measured value of the number of printed sheets in the plain paper mode from the time J1 to the time J2, and m2 is the measured value of the number of printed sheets in the coated paper mode from the time J2 to the time J3. Moreover, a1 and b1 are each a weighting coefficient, and satisfy $0 < a1 < 1$ and $a1 + b1 = 1$.

At the time J3 when the image forming mode is changed from the coated paper mode to the plain paper mode, the controller 60 determines whether or not the measured operation value CNT1' for the plain paper mode has exceeded a predetermined value (certain value). FIG. 17 shows a case in which the controller 60 determines at the time J3 that the measured operation value CNT1' for the plain paper mode has not exceeded the certain value. Accordingly, the controller 60 does not perform the setup processing at the time J3. At the time J3, state qualities are corrected by employing, for example, a method of setting the state qualities (an output light amount value LD1 of a semiconductor laser 27 and the like) stored in an EEPROM 604 in the previous setup processing at the time J1 without modification.

Then, at a time J4 when the measured operation value CNT1' for the plain paper mode exceeds the certain value (plain paper setup interval), the controller 60 performs the setup processing.

Thereafter, the image forming mode is assumed to be changed from the plain paper mode to the coated paper mode at a time J5. In this case, the controller 60 uses a result obtained by performing a mathematical operation with the following expression (4), as the measured value of the number of printed sheets measured by the sheet-number counter CNT2 for the coated paper mode from the time J2 when the sheet-number counter CNT2 started the measurement. Specifically, a measured mathematical value CNT2' of the sheet-number counter CNT2 is $$CNT2'=m2 \times b2+(m3+m4) \times a2 \quad (4)$$

where m3+m4 is the measured value of the number of printed sheets in the plain paper mode from the time J3 to the time J5. Moreover, a2 and b2 are each a weighting coefficient, and satisfy 0<a2<1 and a2+b2=1.

At the time J5 when the image forming mode is changed from the plain paper mode to the coated paper mode, the controller 60 determines whether or not the measured operation value CNT2' for the coated paper mode has exceeded a predetermined value (certain value). FIG. 17 shows a case in which the controller 60 determines at the time J5 that the measured operation value CNT2' for the coated paper mode has exceeded the certain value (coated paper setup interval). Accordingly, the controller 60 performs the setup processing at the time J5.

As described above, the controller 60 of the fourth exemplary embodiment performs the mathematical operation to weight differently the measured value of the sheet-number counter CNT1 for the plain paper mode and the measured value of the sheet-number counter CNT2 for the coated paper mode, to obtain the measured operation values, and then uses the measured operation values respectively as the measured values of the sheet-number counters CNT1 and CNT2. Depending on whether or not the measured operation value CNT1' or CNT2' has exceeded the predetermined value (certain value) for the corresponding one of the plain paper mode and the coated paper mode, the controller 60 determines whether or not to perform the setup processing.

With this configuration, the timing of performing the setup processing is optimized even when the variation range of each state quality is different between operation states in different image forming modes.

[Fifth Exemplary Embodiment]

In the first exemplary embodiment, is the description has been given of the configuration in which the interval (certain value) at which the setup processing is performed is set for each image forming mode, and the setup processing is performed when the measured value of the cumulative number of printed sheets after the previous setup processing in one of the image forming modes reaches the predetermined value (certain value). In the fifth exemplary embodiment, description will be given of a configuration in which, when the image forming mode is changed, a detected density value of each of reference density patterns for each color is used as a target value for the image density in the newly-set image forming mode. Here, the detected density value is an example of information detected in the first setup processing after the change. Incidentally, the same reference numerals are given to the same components as those in the first exemplary embodiment, and the detailed explanation thereof is omitted here.

An image forming apparatus 1 of the fifth exemplary embodiment performs a setup processing after a change in the image forming mode. In the setup processing, a target value for the image density in the newly-set image forming mode is set at a detected density value of each of reference density patterns for each color detected in the setup processing after the change. Thereby, the image forming apparatus 1 performs the setup processing based on the set target value.

Figure 18:
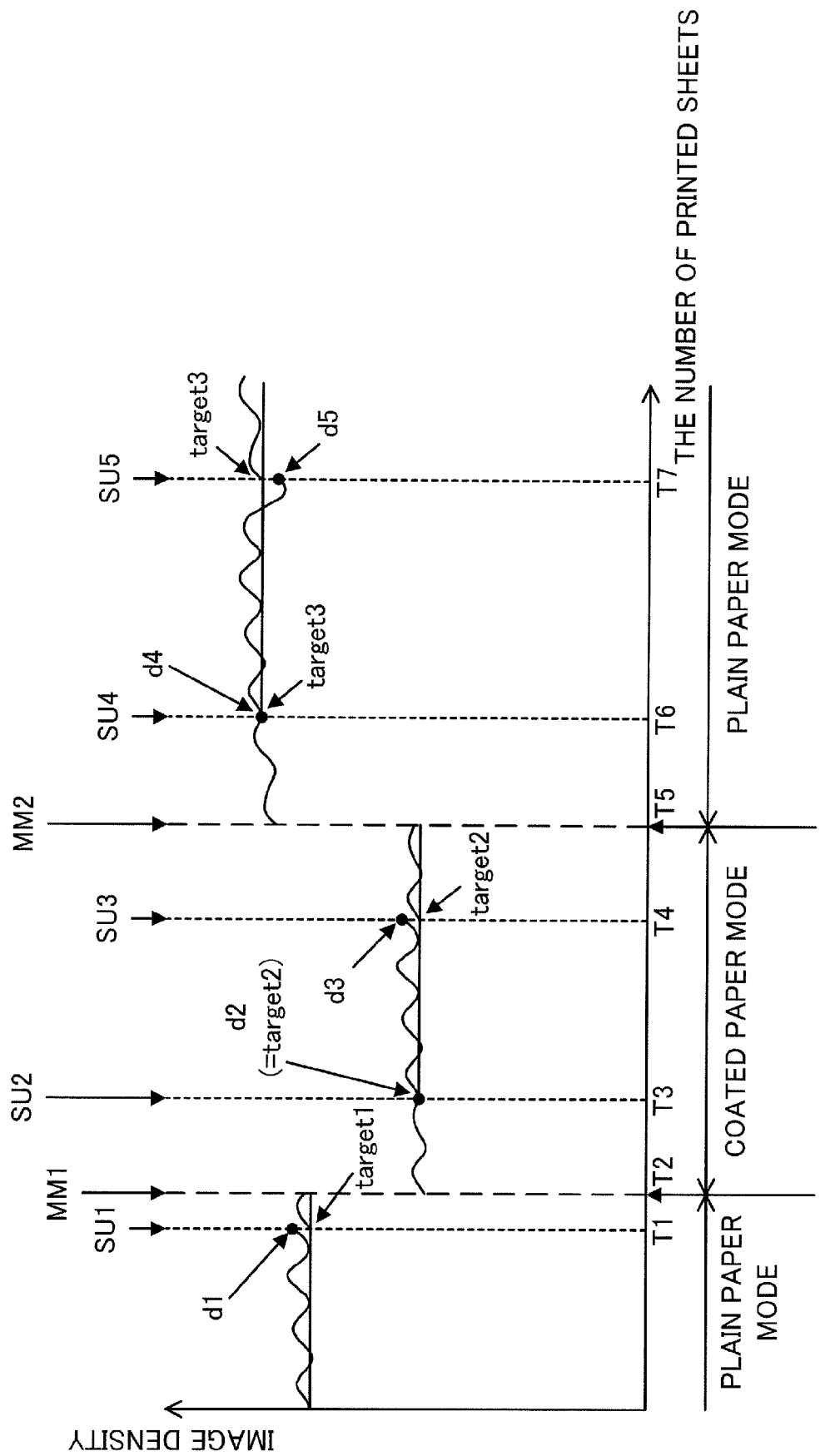
FIG. 18 is a view for explaining operation in the setup processing performed after a change in the image forming mode.

FIG. 18 is a view for explaining operation in the setup processing performed after a change in the image forming mode. The timing at which the image forming apparatus 1 of the fifth exemplary embodiment performs the setup processing may be one in accordance with a different predetermined rule from those for the above-described timings described in the first to fourth exemplary embodiments.

First, the plain paper mode is set, for example, and, at a time T1, the setup processing (SU1) is performed in a state where the plain paper mode is set. Here, the setup processing at the time T1 is assumed to be the second or subsequent setup processing after the plain paper mode is set. In this case, at the time T1, the following setup processing is performed. Specifically, the detected density value (d1) of each of the reference density patterns for each color detected by a reference density detection sensor 55 is compared with the corresponding target value 1 (target 1) for the image density in the plain paper mode stored in an EEPROM 604 in the controller 60. Then, according to the comparison result, a detected humidity value and a detected temperature value, an output light amount value of a semiconductor laser 27 is corrected to be an output light amount value LD1 so that the image density would be the target value 1. By this operation, as the target value 1 in this case, the detected density value of each of the reference density patterns for each color detected by a reference density detection sensor 55 is set in the first setup processing in the case of setting the current plain paper mode.

Assume that the image forming mode is changed to the coated paper mode at a time T2 after the time T1 (MM1). At a time T3, the first setup processing after the change to the coated paper mode is assumed to be performed. Here, the time T3 is timing at which the setup processing in the coated paper mode is performed in accordance with the predetermined rule. In this case, at the time T3, the following setup processing is performed. Specifically, in the setup processing (SU2) at the time T3, a detected density value (d2) of each of reference density patterns for each color detected by the reference density detection sensor 55 is set as a target value 2 (target 2) for the image density. Then, the target value 2 is stored in the EEPROM 604 in the controller 60, and an output light amount value of the semiconductor laser 27 is set to an output light amount value LD2 so that the image density would be the target value 2.

After the first setup processing at the time T3, the second setup processing (SU3) in the coated paper mode is assumed to be performed at a time T4. Here, the time T4 is timing at which the next setup processing in the coated paper mode is performed in accordance with the predetermined rule. In the setup processing at the time T4, the detected density value (d3) of each of the reference density patterns for each color detected by the reference density detection sensor 55 is compared with the corresponding target value 2 (target 2) for the image density in the coated paper mode stored in the EEPROM 604 in the controller 60 at the time T3. On the basis of the comparison result, the detected humidity value and the detected temperature value, the output light amount value of the semiconductor laser 27 is corrected to be the output light amount value LD2 so that the image density would be the target value 2.

Thereafter, assume that the coated paper mode is again changed to the plain paper mode at a time T5 (MM2). The first setup processing after the change to the plain paper mode is performed at a time T6. Here, the time T6 is timing at which the setup processing in the plain paper mode is performed in accordance with the predetermined rule. In this case, at the time T6, the following setup processing is performed. Specifically, in the setup processing (SU4) at the time T6, a detected density value (d4) of each of the reference density patterns for each color detected by the reference density detection sensor 55 is set as a target value 3 (target 3) for the image density, and the target value 3 is stored in the EEPROM 604 in the controller 60. Then, the output light amount value of the semiconductor laser 27 is set at the output light amount value LD2 so that the image density would be the target value 3.

Subsequently, the second setup processing (SU5) in the plain paper mode is assumed to be performed at a time T7 after the setup processing (SU4) at the time T6. Here, the time T7 is timing at which the next setup processing in the plain paper mode is performed in accordance with the predetermined rule. In the setup processing at the time T7, a detected density value (d5) of each of the reference density patterns for each color detected by the reference density detection sensor 55 is compared with the corresponding target value 3 (target 3) for the image density in the plain paper mode stored in the EEPROM 604 in the controller 60. On the basis of the comparison result, the detected humidity value and the detected temperature value, the output light amount value of the semiconductor laser 27 is corrected to be the output light amount value LD2 so that the image density would be the target value 3.

As described above, in the image forming apparatus 1 of the fifth exemplary embodiment, when the image forming mode is changed, the detected density value of each of the reference density patterns for each color, which is an example of information detected in the first setup processing after the image forming mode is changed, is set as the target value for the image density in the newly-set image forming mode. The setup processing in which the detected density value is corrected to be the set target value is performed until the image forming mode is changed. Thereby, a variation in image density in the same image forming mode is reduced to a small amount.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image forming unit that forms an image on a medium by using an image forming portion;
   a mode setting unit that sets an image forming mode of a plurality of image forming modes, the plurality of image forming modes setting, at a time of forming the image, different image forming conditions for the image forming portion included in the image forming unit;
   an adjusting unit that performs adjustment of an image forming condition in the image forming mode set by the mode setting unit; and
   a measuring unit that individually measures, for each of the image forming modes, a progress state after the adjustment of the image forming condition is performed by the adjusting unit in the image forming mode set by the mode setting unit,
   the adjusting unit performing the adjustment of the image forming condition when the progress state in the image forming mode set by the mode setting unit exceeds a certain value in the image forming mode, the progress state being measured by the measuring unit;
   wherein the progress state comprises a counter for a type of paper used;
   wherein the adjusting unit is configured to automatically set a standard mode based on a majority type of paper used from among a plurality of printed sheets of paper, and to automatically change the standard mode based on a change of the majority type of paper used.

2. The image forming apparatus according to claim 1, further comprising a detecting unit that detects a state quantity indicating a state of the image formed on the medium by the image forming unit, wherein the adjusting unit performs the adjustment of the image forming condition in accordance with a detection result of the state quantity detected by the detecting unit and a target value for the state quantity, and changes the target value for the state quantity in accordance with the state quantity detected by the detecting unit after the mode setting unit changes the image forming mode.

3. The image forming apparatus according to claim 2, further comprising a memory that stores a target value for the state quantity in a certain one of the image forming modes set by the mode setting unit, wherein,
   when the mode setting unit sets the certain one of the image forming modes, the adjusting unit performs adjustment of an image forming condition in accordance with a detection result of a state quantity detected by the detecting unit and a target value for the state quantity in the certain one of the image forming modes stored in the memory, and when the mode setting unit sets another image forming mode other than the certain one of the image forming modes, the adjusting unit changes a target value for the state quantity in accordance with a state quantity detected by the detecting unit after the another image forming mode is changed.

4. The image forming apparatus according to claim 1, wherein, when the image forming mode is changed by the mode setting unit, the adjusting unit sets, as an image forming condition for the changed image forming mode, an image forming condition that is calculated on the basis of an image forming condition set by the adjustment performed when the changed image forming mode is set before the change and a variation amount of the image forming condition set for the image forming mode set immediately before the changed image forming mode.

5. The image forming apparatus according to claim 1, wherein the measuring unit measures the progress state after previous adjustment performed by the adjusting unit in each of the image forming modes.

6. The image forming apparatus according to claim 5, wherein, when the image forming mode is changed by the mode setting unit, the measuring unit cumulatively measures the progress state in the image forming mode before the image forming mode is changed and the progress state in the image forming mode when the image forming mode is set again after the image forming mode is changed.

7. The image forming apparatus according to claim 1, wherein the adjusting unit individually sets, for each of the image forming modes, the certain value for the progress state measured by the measuring unit, the certain value being used as reference for the adjustment of the image forming condition.

8. The image forming apparatus according to claim 1, wherein, when the mode setting unit changes the image forming mode, if the progress state in the changed image forming mode measured by the measuring unit exceeds a certain value in the changed image forming mode, the adjusting unit starts the adjustment in a state where the image forming mode before the change is set.

9. A controlling device comprising:
    a mode setting unit that sets an image forming mode of a plurality of image forming modes, the plurality of image forming modes setting different image forming conditions for an image forming portion used at a time of forming an image on a medium;
    an adjusting unit that performs adjustment of an image forming condition in the image forming mode set by the mode setting unit;
    a progress state obtaining unit that obtains a measured value of a progress state for each of the image forming modes, from a measuring unit that individually measures the progress state for each of the image forming modes after the adjusting unit performs the adjustment of the image forming condition in the image forming mode set by the mode setting unit; and
    a controller that performs such a control that the adjusting unit performs the adjustment of the image forming condition, when a measured value of the progress state in the image forming mode set by the mode setting unit exceeds a certain value, the measured value being obtained by the progress state obtaining unit in the image forming mode;
    wherein the progress state comprises a counter for a type of paper used;
    wherein the adjusting unit is configured to automatically set a standard mode based on a majority type of paper used from among a plurality of printed sheets of paper, and to automatically change the standard mode based on a change of the majority type of paper used is changed.

10. The controlling device according to claim 9, further comprising a state quantity obtaining unit that obtains a state quantity indicating a state of the image formed on the medium, wherein
    the adjusting unit performs the adjustment of the image forming condition in accordance with the state quantity obtained by the state quantity obtaining unit and a target value for the state quantity, and changes the target value for the state quantity in accordance with the state quantity obtained by the state quantity obtaining unit after the mode setting unit changes the image forming mode.

11. The controlling device according to claim 10, further comprising a target value obtaining unit that obtains a target value for the state quantity from a memory that stores a target value for the state quantity in a certain one of the image forming modes set by the mode setting unit, wherein,
    when the mode setting unit sets the certain one of the image forming modes, the adjusting unit performs adjustment of an image forming condition in accordance with the state quantity obtained by the state quantity obtaining unit and a target value for the state quantity in the certain one of the image forming modes obtained by the target value obtaining unit, and when the mode setting unit sets another image forming mode other than the certain one of the image forming modes, the adjusting unit changes a target value for the state quantity in accordance with the state quantity obtained by the state quantity obtaining unit after the another image forming mode is changed.

12. The controlling device according to claim 9, wherein, when the image forming mode is changed by the mode setting unit, the adjusting unit sets, as an image forming condition for the changed image forming mode, an image forming condition that is calculated on the basis of an image forming condition set by the adjustment performed when the changed image forming mode is set before the change and a variation amount of the image forming condition set for the image forming mode set immediately before the changed image forming mode.

13. The controlling device according to claim 9, wherein the controller individually sets, for each of the image forming modes, the certain value for a calculated value of the progress state obtained by the progress state obtaining unit, the certain value being used as reference for the adjustment of the image forming condition.

14. The controlling device according to claim 9, wherein, when the mode setting unit changes the image forming mode, if a measured value of the progress state in the changed image forming mode obtained by the progress state obtaining unit exceeds a certain value in the changed image forming mode,
    the adjusting unit starts the adjustment in a state where the image forming mode before the change is set.

15. An image formation method for preventing decrease in image productivity, comprising:
    setting, with one or more processors, an image forming mode of a plurality of image forming modes, the plurality of image forming modes setting different image forming conditions for an image forming portion used at a time of forming an image on a medium;
    performing adjustment of an image forming condition in the image forming mode that has been set;
    obtaining a measured value of a progress state for each of the image forming modes, from a measuring unit that individually measures the progress state for each of the image forming modes after the adjustment of the image forming condition is performed in the image forming mode that has been set;
    performing such a control that the adjustment of the image forming condition is performed, when a measured value of the progress state in the image forming mode exceeds a certain value in the image forming mode that has been set; and
    automatically setting an initial standard mode based on a majority type of paper used from among a plurality of printed sheets of paper, and automatically changing the initial standard mode based on a change of the majority type of paper used;
    wherein the progress state comprises a counter for a type of paper used.

16. A non-transitory computer readable medium storing a program causing a computer to execute a process for preventing decrease in image productivity, the process comprising:

setting an image forming mode of a plurality of image forming modes, the plurality of image forming modes setting different image forming conditions for an image forming portion used at a time of forming an image on a medium;

performing adjustment of an image forming condition in the image forming mode that has been set;

obtaining a measured value of a progress state for each of the image forming modes, from a measuring unit that individually measures the progress state for each of the image forming modes after the adjustment of the image forming condition is performed in the image forming mode that has been set;

performing such a control that the adjustment of the image forming condition is performed, when a measured value of the progress state in the image forming mode exceeds a certain value in the image forming mode that has been set; and automatically setting a standard mode based on a majority type of paper used from among a plurality of printed sheets of paper, and automatically changing the standard mode based on a change of the majority type of paper used;

wherein the progress state comprises a counter for each type of paper used.

17. The image forming apparatus according to claim 1, wherein the progress state is a cumulative number of printed sheets measured by the measuring unit;

wherein the adjustment of the image forming condition performed by the adjusting unit is a setup processing for accommodating the image forming conditions to changes in a state of the image forming portion.

18. The image forming apparatus according to claim 17, wherein the setup processing is set to be performed when the cumulative number of printed sheets measured by the measuring unit exceeds a certain number of sheets determined for a plain paper mode or a coated paper mode.

19. The image forming apparatus according to claim 17, wherein an interval of performing each of a start-up setup processing, a setup processing during image forming operation and an ending setup processing as the setup processing is set by a certain number of printed sheets measured by the measuring unit.

20. The image forming apparatus according to claim 17, wherein the measuring unit is a sheet-number counter.

21. The controlling device according to claim 9, wherein the progress state is a cumulative number of printed sheets measured by the measuring unit; wherein the adjustment of the image forming condition performed by the adjusting unit is a setup processing which is adjustment processing for accommodating the image forming conditions to changes in a state of the image forming portion.

22. The controlling device according to claim 21, wherein the setup processing is set to be performed when the cumulative number of printed sheets measured by the measuring unit exceeds a certain number of sheets determined for a plain paper mode or a coated paper mode.

* * * * *